United States Patent
Webster et al.

(10) Patent No.: US 10,916,075 B1
(45) Date of Patent: Feb. 9, 2021

(54) DYNAMIC DRIVING COMPARISON GROUPS FOR ASSESSING DRIVING SAFETY

(71) Applicant: STATE FARM MUTUAL AUTOMOBILE INSURANCE COMPANY, Bloomington, IL (US)

(72) Inventors: Eric Webster, Bloomington, IL (US); Eric Dahl, Newman Lake, WA (US); Blake Konrardy, San Francisco, CA (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 226 days.

(21) Appl. No.: 15/679,336

(22) Filed: Aug. 17, 2017

Related U.S. Application Data

(60) Provisional application No. 62/514,049, filed on Jun. 2, 2017.

(51) Int. Cl.
| | |
|---|---|
| *G07C 5/08* | (2006.01) |
| *G07C 5/00* | (2006.01) |
| *G06Q 40/08* | (2012.01) |
| *G09B 19/16* | (2006.01) |
| *G09B 5/02* | (2006.01) |
| *G09B 19/14* | (2006.01) |
| *H04L 29/08* | (2006.01) |

(52) U.S. Cl.
CPC ........... *G07C 5/0816* (2013.01); *G06Q 40/08* (2013.01); *G07C 5/008* (2013.01); *G07C 5/0808* (2013.01); *G09B 5/02* (2013.01); *G09B 19/14* (2013.01); *G09B 19/167* (2013.01); *H04L 67/12* (2013.01)

(58) Field of Classification Search
None
See application file for complete search history.

(56) References Cited

U.S. PATENT DOCUMENTS

| | | | | |
|---|---|---|---|---|
| 2011/0106370 A1* | 5/2011 | Duddle | ................. | G06Q 40/08 701/31.4 |
| 2011/0112717 A1* | 5/2011 | Resner | ................... | G07C 5/008 701/31.4 |
| 2013/0164714 A1* | 6/2013 | Hunt | .................... | G09B 19/167 434/65 |
| 2017/0206717 A1* | 7/2017 | Kuhnapfel | .............. | H04L 67/22 |

* cited by examiner

*Primary Examiner* — Lail A Kleinman
(74) *Attorney, Agent, or Firm* — Faegre Drinker Biddle & Reath LLP

(57) ABSTRACT

Techniques for using dynamic comparison groups to assess driving safety are provided. Customizable comparison groups of vehicle operator's may be created based upon specific parameters. Drivers belonging to each specific comparison group may be ranked among one another based upon a comparison of telematics data that is associated with each vehicle, which may indicate various metrics associated with each driver's driving safety. By providing each driver's ranking within comparison groups, a gamified interface and user interaction is achieved, which promotes competition and acts as an incentive for the drivers to drive safer and avoid risk. Additional incentives may be provided in the form of automobile insurance premium discounts and recommendations for improving the driver's ranking.

20 Claims, 12 Drawing Sheets

DYNAMIC DRIVING COMPARISON GROUPS FOR ASSESSING DRIVING SAFETY

CROSS-REFERENCE TO RELATED APPLICATIONS

This application claims priority to Provisional Application No. 62/514,049, entitled "Dynamic Driving Comparison Groups For Assessing Driving Safety" and filed on Jun. 2, 2017, which is incorporated herein by reference in its entirety.

TECHNICAL FIELD

The present disclosure relates to using dynamic comparison groups for assessing driving safety and, more particularly, to presenting a gamified interactive process that ranks drivers associated with vehicles among customizable comparison groups to incentivize safer driving.

BACKGROUND

Generally, vehicle operators (i.e., drivers of vehicles) may exhibit different types of driving behavior while operating a vehicle in different locations, during different conditions, etc. Therefore, conventional systems that may compare and rate the behavior of vehicle operators on a larger scale without compensating for such differences may have several drawbacks.

BRIEF SUMMARY

In contrast to conventional systems, the embodiments of the present disclosure are related to utilizing several customizable variables such as demographic, behavioral, chronological, location-based, and weather-related variables to create comparison groups in which vehicle operators are ranked by driving safety (e.g., safer drivers receive higher rankings). To do so, the present disclosure generally relates to collecting telematics data from several vehicles, and calculating ranking metrics using the telematics data for several vehicles within a created comparison group. Based upon the ranking metrics, the vehicle operators of each of the vehicles may be ranked. Some vehicle operators may receive discounts on their automobile insurance premiums if they are ranked high, while other vehicle operators may receive recommendations on how to improve their driving habits in order to improve their rank within a comparison group.

In one aspect, a computer-implemented method for dynamically comparing customizable groups to assess driving safety may be provided. The method may include one or more processors (1) receiving a first set of telematics data associated with a vehicle operated by a driver; (2) identifying one or more comparison groups including the driver and a plurality of other drivers that share a set of common customizable parameters, each driver from among the plurality of other drivers operating a respective vehicle from among a plurality of other vehicles; (3) selectively accessing a second set of telematics data associated with each of the plurality of other vehicles; (4) calculating a ranking metric for the driver and each of the plurality of other drivers based upon the first set of telematics data and the second set of telematics data to generate a set of ranking metrics; and/or (5) ranking the driver and the plurality of other drivers within the comparison group based upon the set of ranking metrics to facilitate encouraging and rewarding risk-averse behavior and/or driving. The method may include additional, less, or alternate actions, including those discussed elsewhere herein.

In another aspect, a computer server for dynamically comparing customizable groups to assess driving safety may be provided. The server may include (1) a communication unit configured to receive a first set of telematics data associated with a vehicle operated by a driver; and (2) a processor unit configured to: (a) identify one or more comparison groups including the driver and a plurality of other drivers that share a set of common customizable parameters, each driver from among the plurality of other drivers operating a respective vehicle from among a plurality of other vehicles; (b) selectively access a second set of telematics data associated with each of the plurality of other vehicles; (c) calculate a ranking metric for the driver and each of the plurality of other drivers based upon the first set of telematics data and the second set of telematics data to generate a set of ranking metrics; and/or (d) rank the driver and the plurality of other drivers within the comparison group based upon the set of ranking metrics. The server may include additional, less, or alternate components, including those discussed elsewhere herein.

In yet another aspect, a tangible, non-transitory computer-readable medium for dynamically comparing customizable groups to assess driving safety may be provided. The tangible, non-transitory computer-readable medium may include instructions executable by one or more processors that, when executed by the one or more processors, cause the one or more processors to (1) receive a first set of telematics data associated with a vehicle operated by a driver; (2) identify one or more comparison groups including the driver and a plurality of other drivers that share a set of common customizable parameters, each driver from among the plurality of other drivers operating a respective vehicle from among a plurality of other vehicles; (3) selectively access a second set of telematics data associated with each of the plurality of other vehicles; (4) calculate a ranking metric for the driver and each of the plurality of other drivers based upon the first set of telematics data and the second set of telematics data to generate a set of ranking metrics; and/or (5) rank the driver and the plurality of other drivers within the comparison group based upon the set of ranking metrics. The non-transitory computer-readable medium may include additional, less, or alternate instructions, including those discussed elsewhere herein.

As discussed further herein, systems, computing devices, and/or computer-readable media storing executable instructions for implementing all or part of the various techniques described herein may also be provided, or act in combination with one another, in some embodiments. For example, computing devices and systems may include one or more of the following: a special-purpose computing device, a mobile computing device, a personal electronic device, an on-board computer, one or more remote servers or a cloud computing system, one or more remote data storage entities, one or more sensors, one or more communication modules configured to communicate wirelessly via radio links, radio frequency links, wireless or digital communication channels, and/or one or more non-transitory, tangible program memories coupled to one or more processors of the aforementioned devices and/or systems. Such program memories may store instructions, which, when executed by the one or more processors, may cause a device and/or system described herein (or individual components of such a system) to implement part or all of one or more techniques described herein. Additional or alternative features described herein may be included in some embodiments.

Advantages will become more apparent to those of ordinary skill in the art from the following description of the preferred aspects which have been shown and described by way of illustration. As will be realized, the present aspects may be capable of other and different aspects, and their details are capable of modification in various respects. Accordingly, the drawings and description are to be regarded as illustrative in nature and not as restrictive.

BRIEF DESCRIPTION OF DRAWINGS

The figures described below depict various aspects of the present disclosure. It should be understood that each figure depicts an embodiment of a particular aspect of the present disclosure. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and instrumentalities shown, wherein.

Figure 1:
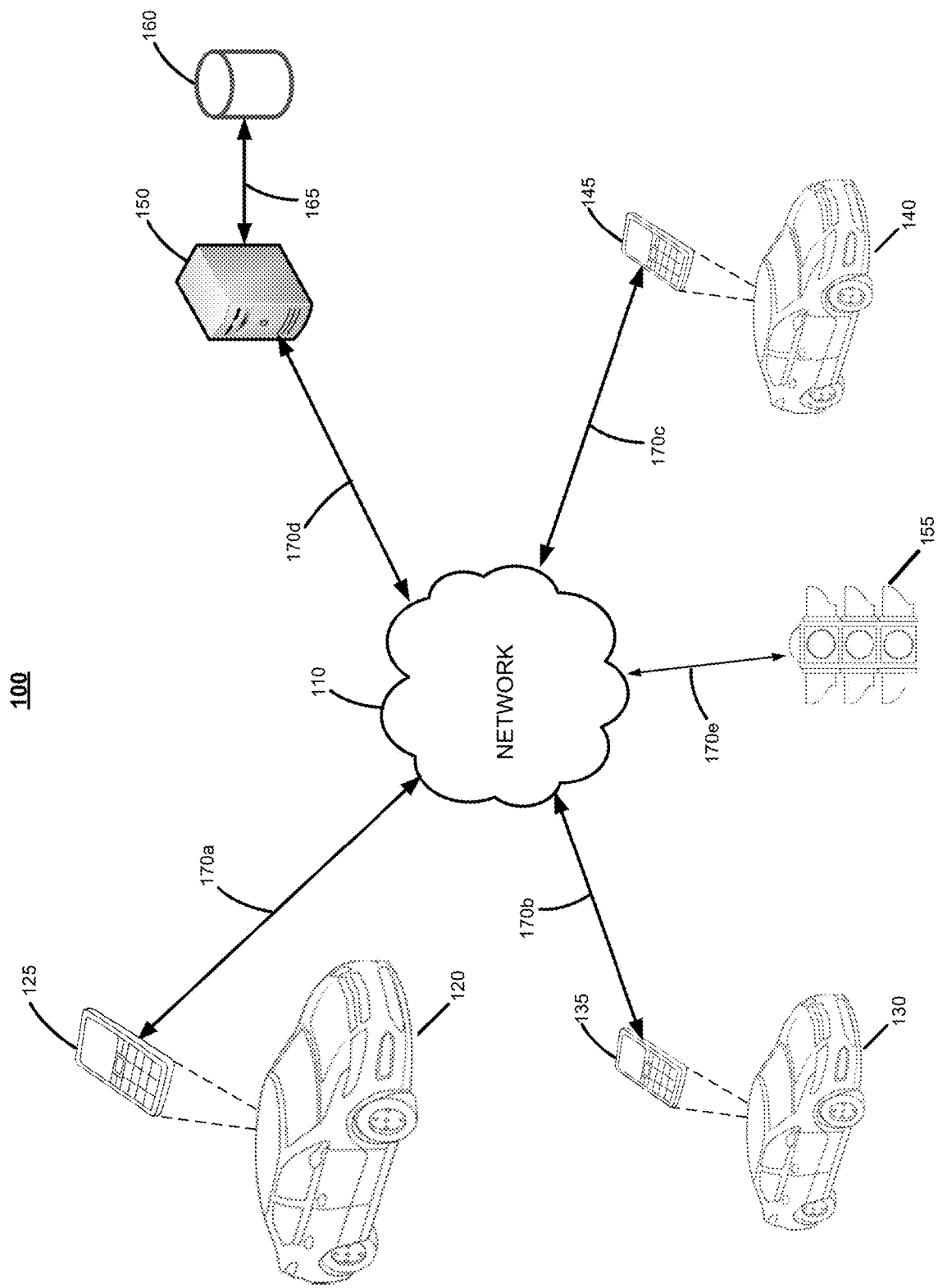
FIG. 1 depicts an exemplary driving assessment system, in accordance with certain aspects of the present technology.

The figures depict aspects of the present invention for purposes of illustration only. One skilled in the art will readily recognize from the following discussion that alternate aspects of the structures and methods illustrated herein may be employed without departing from the principles of the invention described herein.

DETAILED DESCRIPTION

The present embodiments relate to, inter alia, using dynamic, customizable comparison groups for assessing driving safety, which may be used to determine rankings of one or more vehicle operators that belong to the same comparison group, and whom may be insured by an insurance provider. Conventionally, the behavior of vehicle operators may be compared with each other on a large-scale (e.g., drivers in the same state), but other variables (e.g., demographic, behavior, location, etc.) may further influence the behavior of vehicle operators. Therefore, a driver's rating is better assessed by comparing the driver's performance to drivers from smaller, similar groups, rather than large-scale groups.

The aspects described herein leverage collected vehicle telematics data from a group of vehicle operators having one or more variables or parameters (e.g., age, location, etc.) in common to determine a ranking for each driver belonging to a created group. In particular, a "target" vehicle operator that operates a target vehicle may belong to one or more specific comparison groups. For example, a comparison group may be based upon one or more of the driver's age, location, the type of vehicle, etc. Additionally, road conditions (e.g., road construction, weather, traffic, etc.) may also be considered when ranking each driver for each comparison group.

For each comparison group, a target vehicle operator may be ranked amongst the other drivers included in that group. Each driver in a group may also receive feedback regarding his or her rating within one or more groups, which may be created, for example, by the driver's and/or the insurance provider. In this way, the customizable groups allow for a "gamified" interaction among the different drivers, which acts as an incentive for drivers to improve their level of driving safety to "compete" with other drivers, thereby reducing the overall risk of insuring these drivers.

In some aspects, the insurer may further award safer drivers within certain groups with monetary incentives such as discounts on premiums, for example. For instance, the aspects described herein may supply an insurance provider with information about the rankings of individuals (i.e., vehicle operators) within one or more comparison groups. The insurance provider may then determine an automobile insurance premium discount for insured individuals with high rankings within comparison groups selected by the insurer. Conversely, the insurance provider may determine recommendations to insured individuals with low rankings within the comparison group to improve their driving behavior, and thus, improve their rankings. The aspects described herein may periodically or continuously alert insured individuals of their current ranking and/or changes in their rankings within one or more comparison groups. In this way, drivers who improve their ranking may be eligible for future automobile insurance premium discounts, even if they currently do not.

Exemplary Technical Advantages

The aspects described herein offer numerous benefits. In particular, vehicle operators may be more motivated to drive or operate a vehicle (e.g., an autonomous vehicle) in a safer manner if there is an incentive of gamified competition among drivers and/or an opportunity to lower their automobile insurance premiums. If individuals operate vehicles in a safer manner, roadways may become safer, which may prevent accidents and collisions, and in turn may prevent property damage, injury, and death. It should be appreciated that these are only some examples, and that other benefits are also envisioned.

The aspects discussed herein address challenges that are specific to determining driver rankings within comparison groups having one or more common variables. In particular, these challenges relate to difficulties in effectively evaluating an individual's driving behavior or vehicle operation to properly determine a ranking for the driver within each comparison group. To address these issues, the techniques discussed herein utilize telematics data that is collected from several computing devices, vehicles, traffic infrastructure, etc. In various aspects, the rankings for drivers within the comparison group may be determined using this telematics data. Additionally, the various aspects described herein may determine an automobile insurance premium discount or recommendations for a driver to improve his/her driving behavior based upon the driver's ranking within the comparison group. Thus, individuals will be motivated to be safer drivers because of the incentive of discounts on their automobile insurance premiums.

Further, because the aspects described herein employ the collection, compiling, storing, and displaying of data associated with vehicles and their respective operators, the aspects are necessarily rooted in computer technology. In particular, the aspects overcome the noted shortcomings that specifically arise in the realm of how telematics data is collected and implemented to provide accurate comparisons of driver rankings. Accordingly, the aspects described herein provide advantages via the ability to measure, collect, access, and/or process telematics data.

Similarly, the aspects described herein also provide improvements to various technical fields. Namely, these technical fields include data processing, determining statistically valid parameters on which to base comparison groups, generating driver rankings, and determining an automobile insurance premium discount or recommendations for safer driving behavior based upon driver rankings. Instead of merely being performed by hardware components using basic functions, the aspects described herein employ a unique combination of complex steps that go beyond the mere concept of simply retrieving and combining data using a computer.

In particular, the hardware components described herein may perform various functions that include, for example, capturing sensor data, analyzing the sensor data, determining a ranking for an individual (i.e., driver or vehicle operator) within a comparison group, determining a discount on automobile insurance premium for the individual, determining recommendations for the individual to improve his/her driving behavior, and communicating information to the individual such as the driver rankings via an electronic device. This information may include, for example, discounts on automobile insurance premiums and recommendations for the individual to improve his/her driving behavior. This combination of elements further imposes meaningful limits in that the operations are applied to improving sensor data processing and determining driver rankings in a manner that more accurately compares driving performance of different drivers.

The aspects described herein may also support dynamic, real-time, or near real-time analysis of any captured, received, and/or detected data. In particular, an electronic device (e.g., a smartphone) may receive data about a ranking of a vehicle operator that belongs to a particular comparison group of vehicle operators as well as an automobile insurance premium discount in real-time or near real-time, and may generate recommendations to improve the individual's ranking in real-time or near real-time. In this regard, a vehicle operator is afforded the benefit of an automobile insurance premium that represents an accurate representation of his/her driving behavior, as well as recommendations to improve his/her driving behavior, to create a safer vehicle environment in a timely and efficient manner.

System Overview

FIG. 1 depicts an exemplary driving assessment system, in accordance with certain aspects of the present technology. In various aspects, the system 100 may include one or more network(s) 110, remote server(s) 150, database(s) 160, one or more smart infrastructure components 155, and one or more vehicles 120, 130, and 140, each of which is associated with an electronic device 125, 135, and 145, respectively. Although FIG. 1 illustrates one network 110, one remote server 150, one database 160, one smart infrastructure component 155, and three vehicles 120, 130, and 140 with associated electronic devices 125, 135, and 145, it is to be understood that system 100 may include any suitable number of such components.

In certain embodiments, the network(s) 110 may support any suitable number and/or type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others). The network(s) 110 may also include one or more private or local networks or dedicated frequency bands.

Each of electronic devices 125, 135, and 145 may communicate via the network(s) 110 via any suitable number and/or type of wired and/or wireless links, which are represented in FIG. 1 as links 170a-170c. The electronic devices 125, 135, and 145 may additionally or alternatively communicate with one other and/or the remote server 150 via the network(s) 110. For example, the electronic devices 125, 135, and 145 may be located in each of vehicles 120, 130, and 140, respectively, and thus collect and transmit telematics data associated with each of vehicles 120, 130, and 140 to the remote server 150. In various aspects, the electronic devices 125, 135, and 145 may be implemented as any suitable type of device, which may be integrated as part of the vehicle in which it is located or as a portable device separate from the vehicle. For example, the electronic devices 125, 135, and 145 may be implemented as mobile electronic devices, such as smartphones, or as integrated components, such as on-board vehicle computers.

The vehicles 120, 130, 140 may be human operated, or autonomous or semi-autonomous vehicles, in some embodiments. It should be appreciated that other types of electronic devices and/or mobile devices are envisioned, such as notebook computers, tablets, phablets, GNSS-enabled devices, smart watches, smart glasses, smart bracelets, wearable electronics, PDAs (personal digital assistants), pagers, computing devices configured for wireless communication, etc.

Moreover, although not shown in FIG. 1 for purposes of brevity, one or more of vehicles 120, 130, and 140 may likewise communicate with other vehicles, other electronic devices 125, 135, and 145, one or more smart infrastructure components 155, and/or the remote server 150 directly (e.g., via a separate link not shown in FIG. 1) and/or indirectly (e.g., via one or more electronic devices 125, 135, and 145 functioning as a "relay" or "proxy," and/or via one or more via network(s) 110). Embodiments in which one or more of vehicles 120, 130, and 140 may communicate with other devices, such as remote server 150, may be particularly useful when one or more of vehicles 120, 130, and 140 is configured to measure, generate, collect, and/or transmit telematics data independently of the electronic devices 125, 135, and 145. For example, embodiments include one or more of vehicles 120, 130, and 140 being configured with any suitable number and/or type of sensors to measure telematics data.

This telematics data may include the same type of data measured by the electronic devices 125, 135, and 145, as further discussed herein, or different types of data. For example, one or more of vehicles 120, 130, and 140 may include specialized sensors that may be configured to measure different metrics (or the same metrics) as the one or more electronic devices 125, 135, and 145.

Such specialized and/or integrated sensors are not shown in FIG. 1 for purposes of brevity. However, examples of the telematics data generated by such sensors associated with one or more of vehicles 120, 130, and 140 may include data measured by radar, ultrasonic sensors, LIDAR, global navigation satellite system (GNSS) enabled devices, etc. Therefore, the telematics data may include data indicating the vehicle speed, acceleration, cornering, braking, direction, route, heading, GPS information (e.g., speed and location), other location data, as well as other information. Additionally or alternatively, the sensors associated with one or more of vehicles 120, 130, and 140 may generate data (which is then included in a telematics data transmission) indicative of changes in the vehicle's geographic position over time, weather conditions, road conditions, etc. The details of the telematics data and additional examples of the type of information that may be included in the telematics data transmission are further discussed below.

Smart infrastructure component 155 may be implemented as any suitable type of traffic infrastructure component configured to receive communications from and/or to send communications to other devices, such as other vehicles 120, 130, 140, other electronic devices 125, 135, and 145, and/or the remote server 150 directly (e.g., via a separate link not shown in FIG. 1 for purposes of brevity) and/or indirectly (e.g., via link 170e in conjunction with one or more network(s) 110 or via one or more electronic devices 125, 135, and 145 functioning as a "relay" or "proxy"), for example. In various aspects, smart infrastructure component 155 may be implemented as a traffic light, a railroad crossing light, a construction notification sign, a roadside display configured to display messages, a billboard display, etc.

In various aspects, the smart infrastructure component 155 may be configured with any suitable number and/or type of sensors to measure telematics data. This telematics data may include the same type of data measured by the electronic devices 125, 135, and 145 (and/or the vehicles 120, 130, and/or 140), or different types of data. For example, the smart infrastructure component 155 may include integrated and/or specialized sensors that are not shown in FIG. 1 for purposes of brevity. Similar to the data measured by one or more of vehicles 120, 130, and/or 140, as discussed above, examples of the telematics data generated by sensors associated with the smart infrastructure component 155 may include data measured by radar, ultrasonic sensors, LIDAR, GNSS enabled devices, etc.

However, given that the smart infrastructure component 155 may be stationary and have a dedicated source of AC power compared to the vehicles 120, 130, and/or 140, aspects include smart infrastructure collecting, measuring, generating, and/or transmitting telematics data in a manner that leverages these advantages. For example, the smart infrastructure 155 may be configured to utilize a dedicated connection to the remote server 150, given that it is not moving and cellular tower handoffs are not required. To provide another example, the smart infrastructure component 155 may be configured with more accurate, sophisticated, and/or power-intensive sensors or other components than cannot feasibly be implemented using a vehicle's battery-powered system.

In various aspects, the telematics data measured by the smart infrastructure component 155 may likewise include data indicating vehicle speed, acceleration, cornering, braking, direction, route, heading, GPS information (e.g., speed and location), other location data, as well as other information. Additionally or alternatively, the sensors associated with the smart infrastructure component 155 may generate data (which is then included in a telematics data transmission) indicative of changes in one or more vehicle's geographic position over time, weather conditions, road conditions, etc.

Remote server 150 may be configured to communicate with one or more vehicles 120, 130, and/or 140, one or more electronic devices 125, 135, and/or 145, and/or one or more smart infrastructure components (e.g., the smart infrastructure component 155) directly and/or indirectly (e.g., via the network(s) 110 using any suitable number and/or type of wired and/or wireless links, represented in FIG. 1 as link 170d). The remote server 150 may also interface with a database 160 via any suitable number and/or type of wired and/or wireless links, which may be represented in FIG. 1 as link 165. In another aspect, the database 160 may be integrated as part of or otherwise built into the remote server 150. The database 160 may contain or store any suitable type and amount of various information and data. In one implementation, the database 160 may store historical telematics data associated with a plurality of other vehicles that were previously operated by a plurality of drivers. Additionally, the database 160 may store information about past and present driver rankings for past and present comparison groups. Further, the database 160 may also store other information such as automobile insurance policy information, personal information of insured individuals, etc.

In various aspects, each of the one or more vehicles 120, 130, and/or 140, one or more electronic devices 125, 135, and/or 145, and/or one or more smart infrastructure components (e.g., smart infrastructure component 155) may transmit a unique identifier (e.g., in the telematics data transmission or as part of the telematics data itself) such that the telematics data transmitted by each device may be later correlated to each device via the remote server 150. To this end, certain aspects include the remote server 150 receiving telematics data and/or other suitable data from one or more components of system 100, such as one or more vehicles 120, 130, and/or 140, one or more electronic devices 125, 135, and/or 145, and/or one or more smart infrastructure components (e.g., the smart infrastructure component 155).

The remote server 150 may determine comparison groups, as discussed further below, process the received telematics data, and compare the telematics data of vehicles within the same comparison group. Based upon this analysis, the remote server 150 may determine rankings for the drivers within the same comparison group, update information associated with the insured drivers' insurance account information, such as premiums, qualifying discounts, etc. The remote server 150 may then transmit information related to the rankings of the drivers in the comparison group and/or the insured individuals' insurance account information (e.g., an automobile insurance premium) to one or more of the electronic devices 125, 135, and 145. The operation of the remote server 150 is further discussed below.

Detailed Operation of an Exemplary Remote Server

Figure 2:
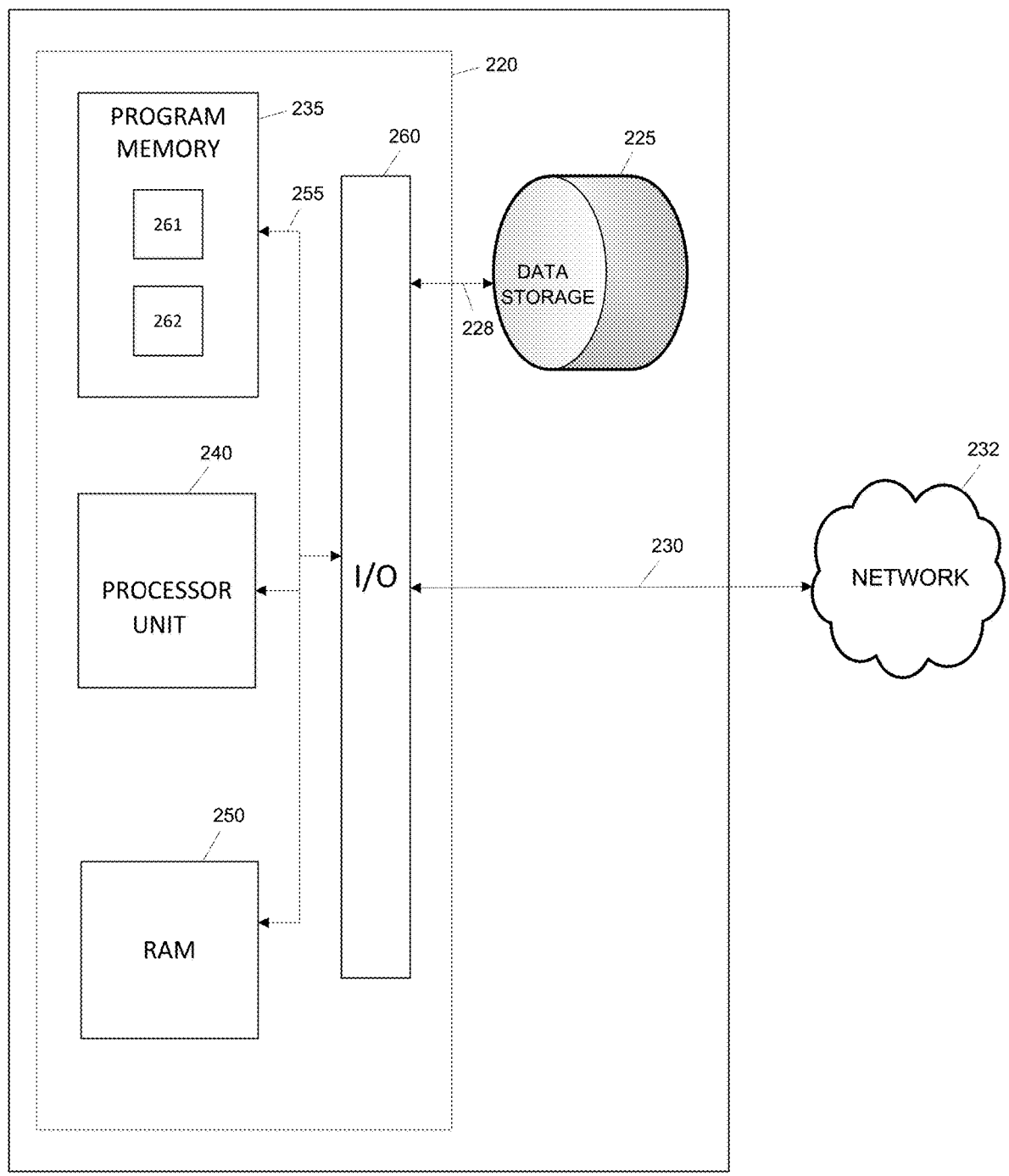
FIG. 2 depicts a block diagram of an exemplary remote server, in accordance with certain aspects of the present technology.

FIG. 2 depicts a block diagram of an exemplary remote server 200, in accordance with certain aspects of the present technology. In one embodiment, remote server 200 may be an implementation of remote server 150, as shown and discussed with respect to FIG. 1. Although only a single server 200 is shown in FIG. 2, this is only one of many embodiments. In some embodiments, multiple servers 200 may be configured to have a logical presence of a single entity, such as a server bank or an arrangement known as "cloud computing." These configurations may provide various advantages, such as enabling near real-time uploads and downloads of information as well as periodic uploads and downloads of information. However, for ease of discussion and not limitation, the server 200 is referred to herein using the singular tense.

In one aspect, the server 200 may include one or more controllers 220 that are operatively connected to a data storage device 225, which may include any suitable device such as a database, for example, (e.g., the database 160, as discussed with respect to FIG. 1) via link 228 and/or 230, which may include one or more local, wired, wireless, and/or remote links. The server 200 may access data stored in the data storage device 225 when executing various functions, tasks, and/or techniques associated with the aspects described herein related to the use of dynamic comparison groups to assess driving. It should be noted that although FIG. 2 depicts a single data storage device 225, aspects include the data storage device 225 being implemented as multiple physical data storage entities, such as a data bank or a data farm.

In various aspects, the data storage device 225 may be adapted or otherwise configured to store data related to historical telematics data associated with a vehicles that were previously operated by respective drivers. Additionally or alternatively, the data storage device 225 may store data related to current and/or historical comparison group rankings such as personal information of the individuals, vehicle information (e.g., vehicle make, vehicle model, VIN, etc.), information about individual automobile insurance policies, etc. In various aspects, at least some of the data stored at the data storage device 225 may be determined or generated based upon at least a portion of the historical telematics data. The data storage device 225 may additionally or alternatively store other types of data used to determine comparison group rankings such as weather-related data, road condition data, traffic data, demographic data, location data, behavior-related data, driving routes, each individual's participation in various social networking groups, etc.

As further discussed herein, the telematics data collected by the remote server 200 from the various electronic devices (e.g., electronic devices 125, 135, and 145, as shown in FIG. 1) may be received in a periodic or continuous fashion. Thus, the telematics data received by the remote server 200 may represent various data points received from each electronic device, which are stored in the data storage device 225 and time-stamped or otherwise time correlated. Additionally, the telematics data may be transmitted with an indication of a geographic location of each electronic device when the telematics data was transmitted. Thus, the various data points stored in the data storage device 225 may also indicate a respective geographic location of each electronic device that is tracked over time. Moreover, the telematics data points stored in the data storage device 225 may be correlated to when and where each telematics data point was collected.

Furthermore, while not shown, additional data storage devices or entities may be linked to the controller(s) 220 in any suitable manner, e.g., locally and/or remotely. For example, additional databases and/or data storage devices (not shown) that store various types of information (e.g., vehicle collisions, road conditions, vehicle insurance policy information, driver performance, vehicle use information, etc.), may be communicatively connected to the controller(s) 220 and/or to the server 210. Additional databases or data storage devices (not shown) may be communicatively connected to the controller(s) 220 and/or to the server 210 via one or more links 230 to one or more networks 232. These additional databases or storage devices may store, for example, data maintained by third parties (e.g., weather databases, road construction databases, traffic congestion databases, road network databases, IoT (Internet-of-Things) or sensor databases implemented by a city or other jurisdiction, etc.). In one embodiment, the one or more networks 232 may include the network 110, as shown and discussed with respect to FIG. 1.

In various aspects, the controller 220 may include one or more program memories 235, one or more processors 240 (which may be called a "processor unit" and include, for example, one or more microcontrollers and/or microprocessors), one or more random-access memories (RAMs) 250, and an input/output (I/O) block 260, one or more of which may be interconnected via an address/data bus 255. Although only one processor unit 240 is shown, the controller 220 may include multiple processor units 240, each of which may include one or more individual processors.

The memory of the controller 220 may also include multiple RAMs 250 and multiple program memories 235, if desired. The RAM 250 and program memories 235 may be implemented as any suitable type of memory, such as semiconductor memories, magnetically readable memories, biologically readable memories, or optically readable memories, for example. The controller 220 may also be operatively connected to the network 232 via the link 230.

The I/O block 260 may be referred to herein as a "communication unit," and facilitate communication between server 200 and one or more other computing devices, such as data storage device 225, network 232, various electronic devices (e.g., electronic devices 125, 135, and 145, vehicles 120, 130, and/or 140, smart infrastructure components 155, etc., as shown in FIG. 1) in accordance with any suitable type and/or number of communication protocols. Therefore, the I/O block 260 may include any suitable number and/or type of components to facilitate this functionality, such as any number of ports, transmitters, receivers, transceivers, antennas, etc. Furthermore, the I/O block 260 may include a number of different types of I/O blocks to facilitate different types of communication protocols and/or simultaneous communications with any suitable number of different components.

The controller 220 may further include a number of applications 261-262 stored in its program memory 235. In one embodiment, the applications 261-262 may include one or more software applications or sets of computer-executable instructions that are stored on the program memory (or memories) 235 and executable by the processor unit 240. For example, program memory 235 may represent a tangible, non-transitory computer-readable medium, with each of the applications 261-262 including instructions executable by one or more processors (e.g., controller 220 and/or processor unit 240) that, when executed by the one or more processors, cause the one or more processors to perform various acts as described herein. To provide another example, the applications 261-262 may be implemented at least partially in firmware and/or in hardware at the server 200.

The various applications may be executed on the same processor unit 240 or on different computer processors in embodiments, as desired. Further, while the various applications 261-262 are depicted as separate applications, two or more of the applications 261-262 may be integrated as an integral application, if desired. In some embodiments, at least one of the applications 261-262 may be implemented in conjunction with another application (not shown) that is stored and executed at the server 200.

In various aspects, the applications 261-262 may include a log generation application 261 configured to generate and record logs including telematics data collected from various vehicles (i.e., from electronic devices associated with the various vehicles) as well as previously-recorded comparison group rankings. The applications 261-262 may also include a dynamic comparison groups (DCG) application 262. The DCG application 262 may be configured to determine rankings for insured drivers within the same comparison group, to update insured drivers' insurance account information, and to support providing feedback to drivers such as their rankings within various comparison groups, updates to their insurance premiums, recommendations to improve their rankings, etc.

For example, DCG application 262 may cause the remote server 200 to access or otherwise communicate with one or more other servers, databases, etc., to securely update insurance account information, such as insured drivers' rankings within a comparison group, whether drivers qualify for safe driver discounts and/or automobile insurance premiums, etc. This information may be updated in accordance with any suitable schedule based upon when new telematics data is acquired. For example, driver rankings may be computed daily, weekly, monthly, etc. Additionally, the DCG application 262 may facilitate remote server 200 determining updated automobile insurance premiums as the rankings are updated. The details associated with determining these rankings, and other functions associated with the server 200, are further discussed below.

Detailed Operation of an Exemplary Electronic Device

Figure 3:
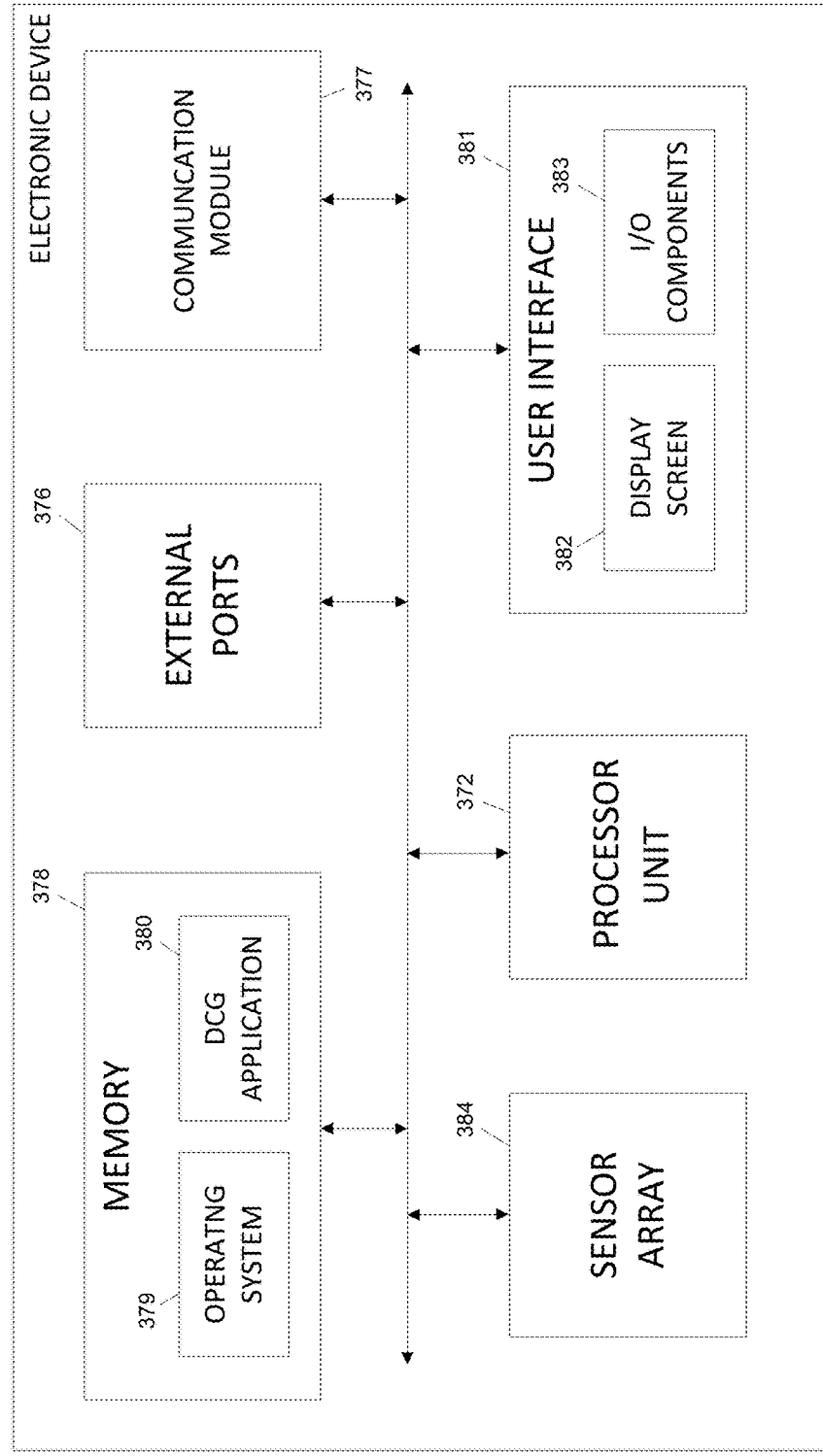
FIG. 3 depicts a block diagram of an exemplary electronic device, in accordance with certain aspects of the present technology.

FIG. 3 depicts a block diagram of an exemplary electronic device, in accordance with aspects of the present technology. FIG. 3 illustrates a diagram of an exemplary mobile or other electronic device 300 (such as one of the electronic devices 125, 135, and/or 145 as discussed with respect to FIG. 1) in which the functionalities as discussed herein may be implemented. Aspects include electronic device 300 being configured for transport in a vehicle and/or connected to an on-board telematics platform of the vehicle. Further, aspects include the electronic device 300 being integrated into an on-board system of the vehicle. In various aspects, any portion of processing performed via server 200 may be performed via the electronic device 300, and vice-versa.

In certain aspects, the electronic device 300 may include a processor unit 372 and a memory 378. The memory 378 may store an operating system 379 and a Dynamic Comparison Groups (DCG) application 380. For example, memory 378 may represent a tangible, non-transitory computer-readable medium, with each of the operating system 379 and the DCG application 380 including instructions executable by one or more processors (e.g., processor unit 372) that, when executed by the one or more processors, cause the one or more processors to perform various acts as described herein. The memory 378 may include one or more forms of volatile and/or non-volatile, fixed, and/or removable memory, such as read-only memory (ROM), electronic programmable read-only memory (EPROM), random access memory (RAM), erasable electronic programmable read-only memory (EEPROM), and/or other hard drives, flash memory, Micro SD cards, and others.

Furthermore, a computer program product in accordance with an aspect may include a computer usable storage medium (e.g., standard random access memory (RAM), an optical disc, a universal serial bus (USB) drive, or the like) having computer-readable program code embodied therein, wherein the computer-readable program code may be adapted to be executed by the processor unit 372 (e.g., working in connection with the operating system 379) to facilitate the functions as described herein. In this regard, the program code may be implemented In any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

For example, the operating system 379 may represent an initial operating system utilized by the electronic device 300. That is, if the electronic device 300 is implemented as a smartphone, then operating system 379 may include one or more files, applications, code, etc., to facilitate user interaction with, and operation of, the electronic device 300.

The DCG application 380 may include an application that is downloaded to or otherwise installed onto the electronic device 300. In various aspects, the DCG application 380 may collect and transmit telematics data and/or other types of data in the background and/or while an operator is driving a vehicle via communication module 377. For example, the DCG application 380 may monitor sensor data collected via the sensor array 384 and transmit this data to a server (e.g., server 200), as further discussed below. DCG application 380 may also monitor or otherwise collect other types of data, which may be transmitted with or separate from the sensor data transmissions, such as time when sensor data was collected, weather conditions (e.g., received via external communications), data identifying the vehicle operator, etc. The data transmitted by the electronic device 300 in this manner, which may include sensor data and other types of data (e.g., geographic location data), may collectively be referred to herein as "telematics data."

Moreover, as used herein, the term "telematics data" may refer to any suitable type of data that may be used to identify a particular device, a particular driver, driving behavior or habits, road conditions, vehicle locations, users, vehicles, a vehicle's movement while being driven, etc., regardless of the particular component or source that generates the telematics data. For example, telematics data may include the aforementioned sensor metrics generated by one or more components of the electronic device 300, such as sensor metrics and/or geographic location data generated and/or measured by the sensor array 384. To provide another example, the telematics data may include information generated by one or more sensors, controllers, or other suitable components of a particular vehicle (e.g., vehicles 120, 130, and/or 140, as discussed above with reference to FIG. 1). To provide yet another example, the telematics data may include information generated by one or more sensors or portion of a smart infrastructure (e.g., smart infrastructure 155, as discussed above with reference to FIG. 1).

To provide an illustrative example, the telematics data may include, regardless of the device generating it, sensor metrics or other information indicating changes in a vehicle's acceleration, braking, cornering, and/or velocity over time, which may include a timestamp associated with the sampled telematics data to allow each sampled data point to be associated with a specific time, thereby facilitating tracking changes in the telematics data. To provide yet another example, the telematics data may include sensor metrics or other information related to accelerometer sensor measurements, gyroscope sensor measurements, compass heading measurements, etc. To provide further examples, the telematics data may include information indicative of changes in the geographic location of a particular electronic device and/or vehicle, which may likewise be correlated to a timestamp to identify the movement of a vehicle over time, and thus track its velocity and/or route.

Still further, the telematics data may include information indicative of a usage of an electronic device (e.g., a log indicating when the user was texting or talking on the phone while driving) and/or a battery level associated with the electronic device. To provide even more examples, the telematics data may include unique information identifying a particular user, vehicle, or smart infrastructure component. The telematics data may also include data identifying certain weather conditions, which may be measured by a particular device or retrieved from a separate data source via data communications by that device and included in a subsequent telematics data transmission. This list is not meant to be exhaustive or limiting, and it will be understood that other types of information may be included in the telematics data transmission not listed here in accordance with the aspects described herein without departing from the spirit and scope of the present disclosure.

The electronic device 300 may further include a communication module 377 that is configured to support data communications between electronic device 300 and one or more other components (e.g., other electronic devices 125, 135, and 145, vehicles 120, 130, and/or 140, remote servers 150, etc., as shown in FIG. 1). For example, the communication module 377 may transmit (e.g., telematics data) and/or receive data and/or notifications from other devices (e.g., server 200) regarding the insured individual's current risk assessment, premium, or updated thereof, which may then be displayed via display screen 382.

According to some embodiments, the communication module 377 may include any suitable type and/or number of components to facilitate such communications, which may occur in accordance with any suitable number and/or type of commination protocols. For example, the communication module 377 may include one or more transceivers (e.g., WWAN, WLAN, and/or WPAN transceivers) functioning in accordance with IEEE standards, 3GPP standards, or other standards, and configured to receive and transmit data via one or more external ports 376. Further, the communication module 377 may include a short-range network component (e.g., an RFID reader) configured for short-range communications.

The electronic device 300 may further include a sensor array 384. The processor unit 372 may execute instructions stored in the DCG application 380 to interface with the sensor array 384 to retrieve and process corresponding sensor data. The sensor array 384 may include one or more sensors configured to collect various types of sensor data, such as velocity data, for example. In various aspects, the sensor array 384 may include one or more cameras, accelerometers, gyroscopes, velocity sensors, magnetometers, barometers, thermometers, proximity sensors, light sensors, Hall Effect sensors, etc. In some aspects in which the sensor array 384 includes one or more accelerometers, the sensor array 384 may be configured to measure and/or collect accelerometer values utilizing an X-axis, Y-axis, and Z-axis accelerometer. In accordance with such aspects, the sensor array 384 may measure sensor metric values as a three-dimensional accelerometer vector that represents the movement of the electronic device 300 in three dimensional space by combining the outputs of the X-axis, Y-axis, and Z-axis accelerometers using any suitable techniques.

In one aspect, accelerometer movement may then be analyzed (either locally via electronic device 300 or via a remote server such as remote server 200) to determine the velocity of the electronic device 300, and thus the velocity of the vehicle in which the electronic device 300 is located. Additionally, accelerometer movement may be analyzed for starting and stopping acceleration of the vehicle, road conditions (e.g., potholes) experienced by the vehicle, etc. Aspects may also include the sensor array 384 measuring the force at which a turn is made (i.e., cornering, braking, etc.). In other words, certain aspects may include the sensor array 384 directly measuring telematics data of the electronic device 300 via any suitable sensor. In any event, the sensor array 384 may facilitate measuring telematics data of the electronic device 300 over time in accordance with any suitable sampling period, such as continuously or periodically, for example.

In one aspect, the sensor array 384 may additionally include a global navigation satellite system (GNSS) configured to determine the geographic location of electronic device 300. In accordance with such aspects, the global navigation satellite system may generate geographic location data utilizing any suitable global positioning techniques. For example, the GNSS may communicate with one or more satellites and/or wireless transmitters to determine a location of the electronic device 300. The GNSS may use "Assisted Global Positioning System" (A-GPS), satellite GPS, or any other suitable global positioning protocol (e.g., the GLONASS system operated by the Russian government, the Galileo system operated by the European Union, etc.) to determine a geographic location of the electronic device 300. Thus, the telematics data transmitted by the electronic device 300 may additionally include geographic location data.

Some aspects may include the geographic location data being analyzed (either locally via electronic device 300 or via a server such as server 200) to determine the location of the electronic device at different times, which may be correlated to other data included in the telematics data, such as sensor data indicating the acceleration, velocity, braking, cornering, etc., of the electronic device 300 (and thus the vehicle in which it is located). Some aspects may also include the geographic location data being analyzed (either locally via electronic device 300 or via a server such as server 200) to track the movement of a vehicle in which the electronic device 300 is located by calculating changes in the vehicle's position over time in accordance with the geographic location data.

The electronic device 300 may further include a user interface 381 that is configured to present information to a user and/or to receive inputs from the user. As shown in FIG. 3, the user interface 381 may include a display screen 382 and I/O components 383 (e.g., ports, capacitive or resistive touch sensitive input panels, keys, buttons, lights, LEDs, speakers, microphones). According to some embodiments, the user may interact with the electronic device 300 via the user interface 381 to review information and/or perform other functions as further discussed herein.

Exemplary User Interface

FIGS. 4A-4H depict an exemplary user interface associated with displaying information about dynamic comparison groups for assessing driving safety, in accordance with aspects of the present technology. FIGS. 4A-4H illustrate display interfaces 400, 410, 420, 430, 440, 450, 460, and 470 respectively, of an electronic device (such as the electronic device 125, 135, and/or 145 with respect to FIG. 1 and/or the electronic device 300 with respect to FIG. 3) for a Dynamic Comparison Groups (DCG) application (e.g., DCG application 380). It is to be understood that the information discussed herein may be conveyed in any suitable manner, and that the display interfaces 400, 410, 420, 430, 440, 450, 460, and 470, as shown in FIGS. 4A-4H, are just some examples.

Figure 4A:
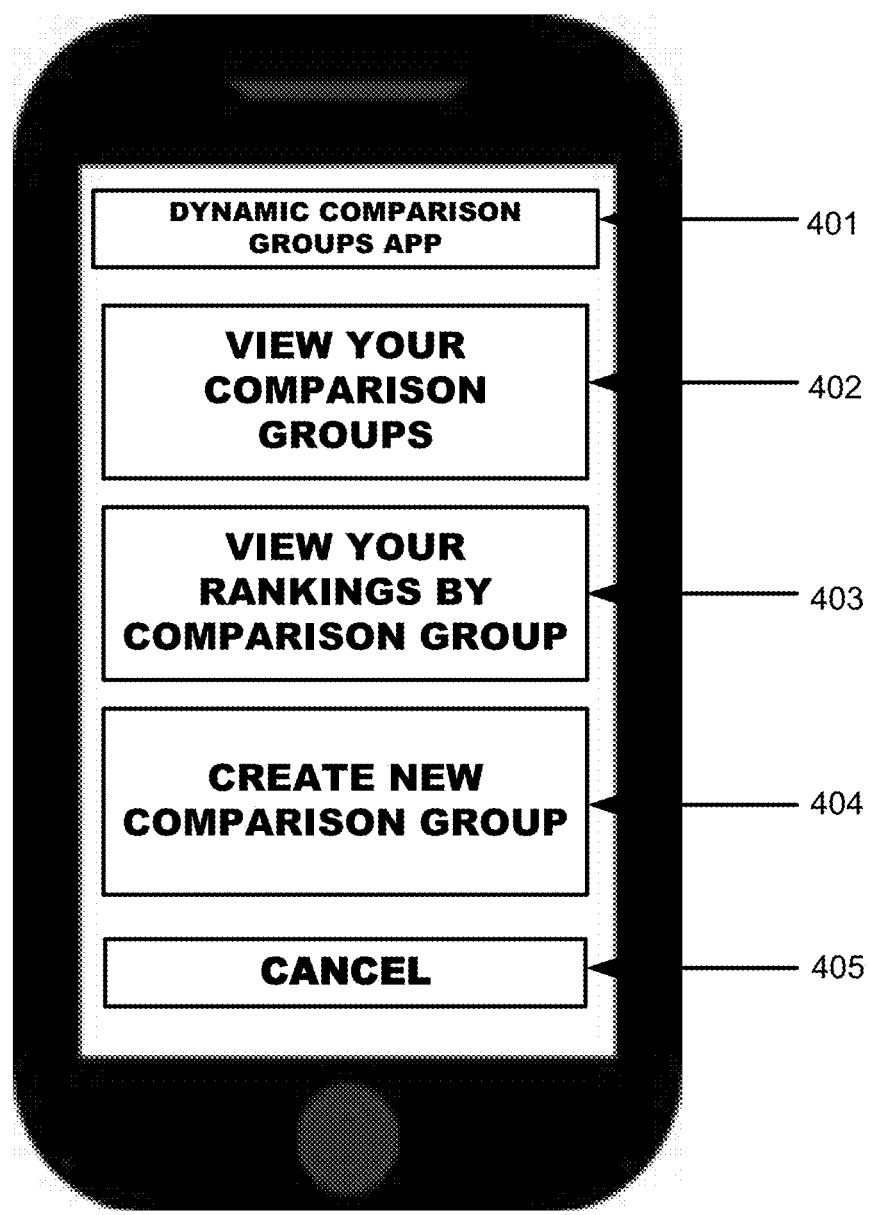
FIGS. 4A-4H depict an exemplary user interface associated with displaying information about dynamic comparison groups for assessing driving safety, in accordance with certain aspects of the present technology.

As shown in FIG. 4A, display interface 400 may include an information box 401 that identifies the application. The display interface 400 may also include an interactive portion 402, which indicates to "VIEW YOUR COMPARISON GROUPS," thereby enabling a user to view a list of his/her comparison groups. Additionally, the display interface 400 may include an interactive portion 403, which indicates to "VIEW YOUR RANKINGS BY COMPARISON GROUP," thereby enabling a user to view a list of his/her rankings for each comparison group to which the user belongs. Further, the display interface 400 may include an interactive portion 404, which indicates to "CREATE NEW COMPARISON GROUP," thereby enabling a user to create a new comparison group. Lastly, the display interface 400 may include an interactive portion 405, which indicates "CANCEL," thereby enabling a user to exit the application, to return to a prior screen, to exit to the home screen, etc.

Figure 4B:
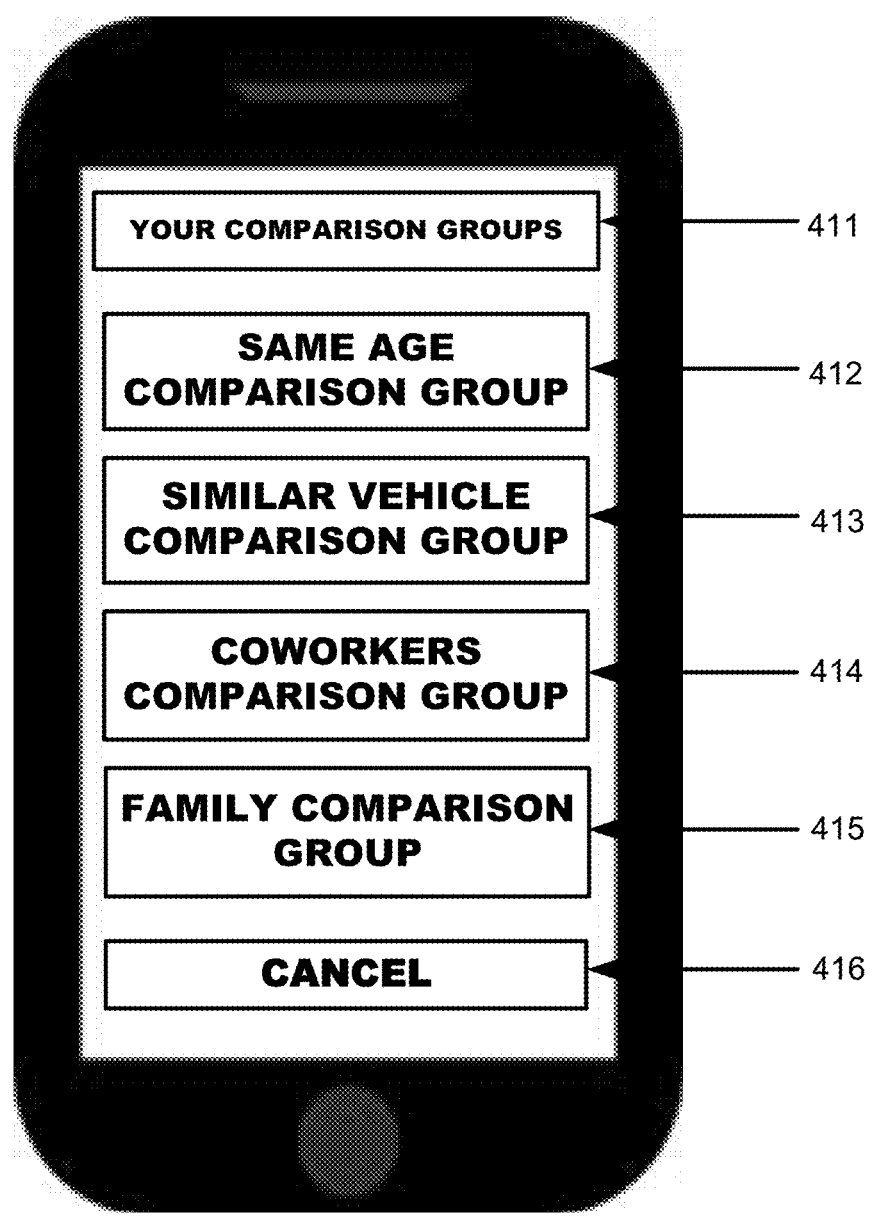

FIG. 4B depicts a display interface 410 that may be accessed if the user selects the interactive portion 402 ("VIEW YOUR COMPARISON GROUPS") from display interface 400, as mentioned above. The display interface 410 may include an information box 411 that identifies which page of the DCG application the user is viewing. The display interface 410 may also include interactive portions 412-415, which allows the user to view information about a specific comparison group to which the user belongs.

For example, as shown in FIG. 4B, the user belongs to four different comparison groups. In various aspects, this may be the result of the user selecting parameters associated with each of these groups, thereby causing the electronic device to transmit these parameters to a remote computing device (e.g., server 200). Upon receiving this information, the server may identify other users that share this particular customizable parameter with the user and generate a comparison group that includes these users. In one aspect, the electronic device 300 may communicate with the server to retrieve and display a user's comparison groups when the interactive portion 402 is selected, thereby presenting to the user a list of the user's current groups, as shown in FIG. 4B. In another aspect, if the user selects one of the listed comparison groups (e.g., the interactive portion 412), the user is directed to another user interface that further displays information about that selected comparison group, which in this example is other users in the "same" age group as the user. This may include, for example, other drivers of the same age or within a range of ages as specified by the user or in accordance with a set of rules provided by the server 200.

As further discussed herein, the comparison groups may include any suitable number and combination of customizable parameters. For example, although not shown in FIG. 4B, a comparison group could include a combination of some (or all) of the comparison groups shown in FIG. 4B, such that the comparison group would include the user and other drivers having the same age, vehicle type, and workplace, for example.

Again, the display interface 410 may include an interactive portion 416, which indicates "CANCEL," thereby enabling a user to exit the application, to return to a prior screen, to exit to the home screen, etc.

Figure 4C:
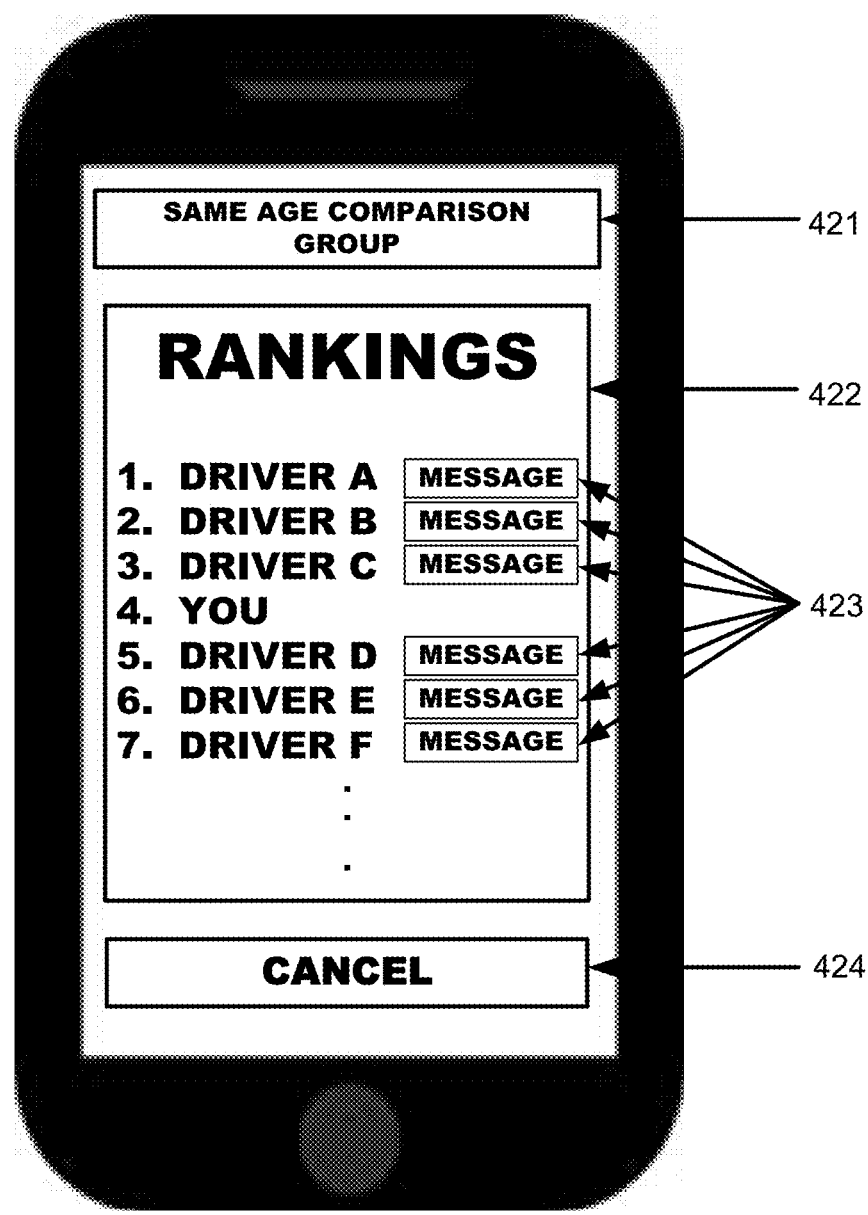

FIG. 4C depicts a display interface 420 that may be accessed if the user selects the interactive portion 412 ("SAME AGE COMPARISON GROUP") on display interface 410. As shown in FIG. 4C, the display interface 420 may include an information box 421 that identifies which page of the DCG application the user is viewing. Additionally, the display interface 420 may include another information box 422 that displays a list of the rankings of drivers that belong to the selected comparison group, which in this case is other drivers having the same age (or within the same range of ages) as the user or "target" driver. Among the list of rankings, the user may be identified. For example, the user may be identified as "YOU" within information box 422.

Within information box 422, there may be interactive portions 423 that indicate to "MESSAGE" and, when selected, allow the user to send a message to another driver that belongs to the comparison group identified by information box 421 in any suitable manner (e.g., a text message, email, a push notification, etc.). Additionally, although not depicted on the display interface 420 shown in FIG. 4C, the user may be able to send the same message to more than one driver that belongs to the comparison group identified by information box 421. Again, the display interface 420 may include an interactive portion 424, which indicates "CANCEL," thereby enabling a user to exit the application, to return to a prior screen, to exit to the home screen, etc.

Figure 4D:
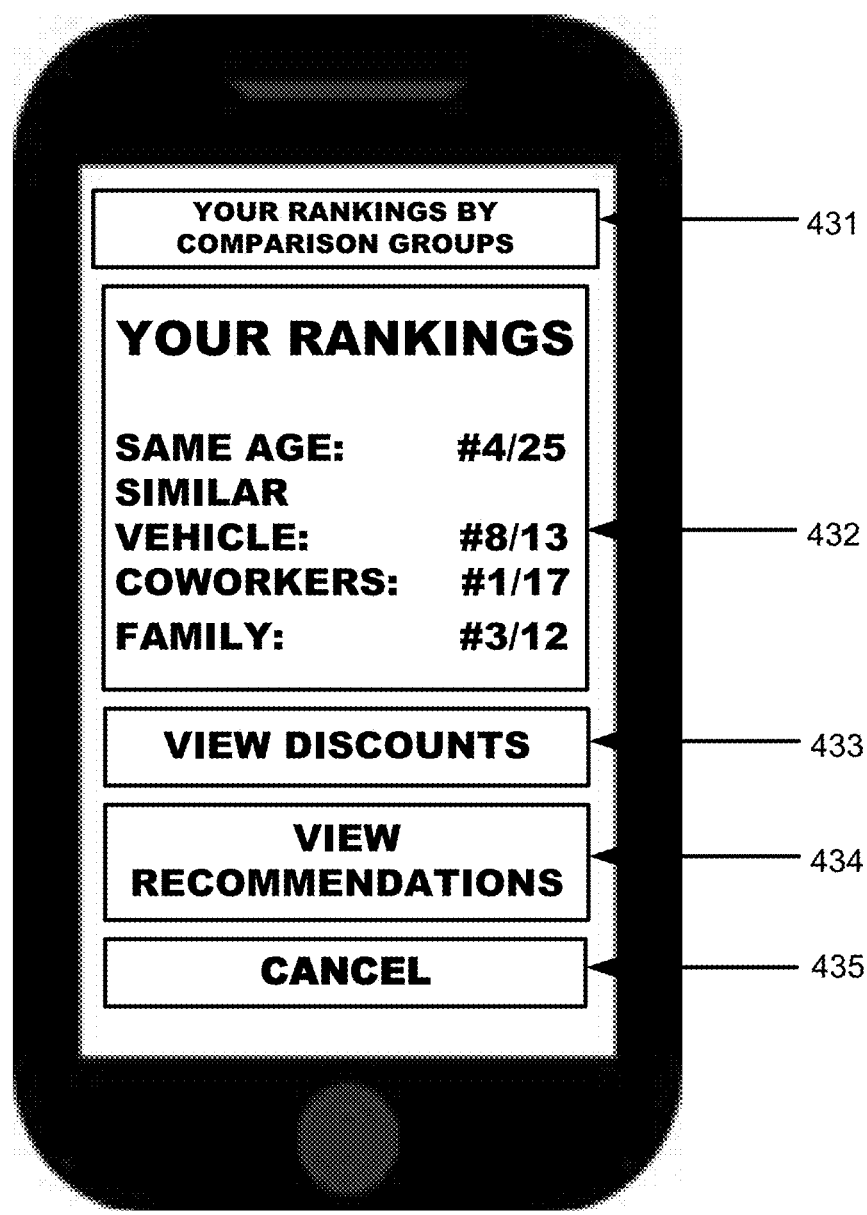

FIG. 4D depicts a display interface 430 that may be accessed if the user selects interactive portion 413 ("VIEW YOUR RANKINGS BY COMPARISON GROUP") from display interface 410. The display interface 430 may include an information box 431 that identifies which page of the DCG application the user is viewing. Additionally, the display interface 430 may include another information box 432 that displays the user's rankings for each comparison group to which the user belongs. The user's rankings for each comparison group listed in information box 432 may be displayed in any suitable manner, such as "X/Y" where "X" is the user's ranking in the comparison group and "Y" is the total number of drivers that belong to the comparison group. To provide other examples (not shown), the user's ranking may be expressed as a percentile, a tier or segment (e.g., upper, mid, lower, etc.), as a graded system (e.g., A-F), etc. The display interface 430 may also include an interactive portion 433, which indicates to "VIEW DISCOUNTS" when applicable, thereby enabling the user to view any discounts that the user's insurance provider may be offering to him/her for good driving behavior in the event that the user's ranking is sufficiently high.

Additionally, the display interface 430 may also include an interactive portion 434, which indicates to "VIEW RECOMMENDATIONS," thereby enabling the user to view any recommendations to improve his/her driving behavior. Again, the display interface 430 may include an interactive portion 435, which indicates "CANCEL," thereby enabling a user to exit the application, to return to a prior screen, to exit to the home screen, etc.

Figure 4E:
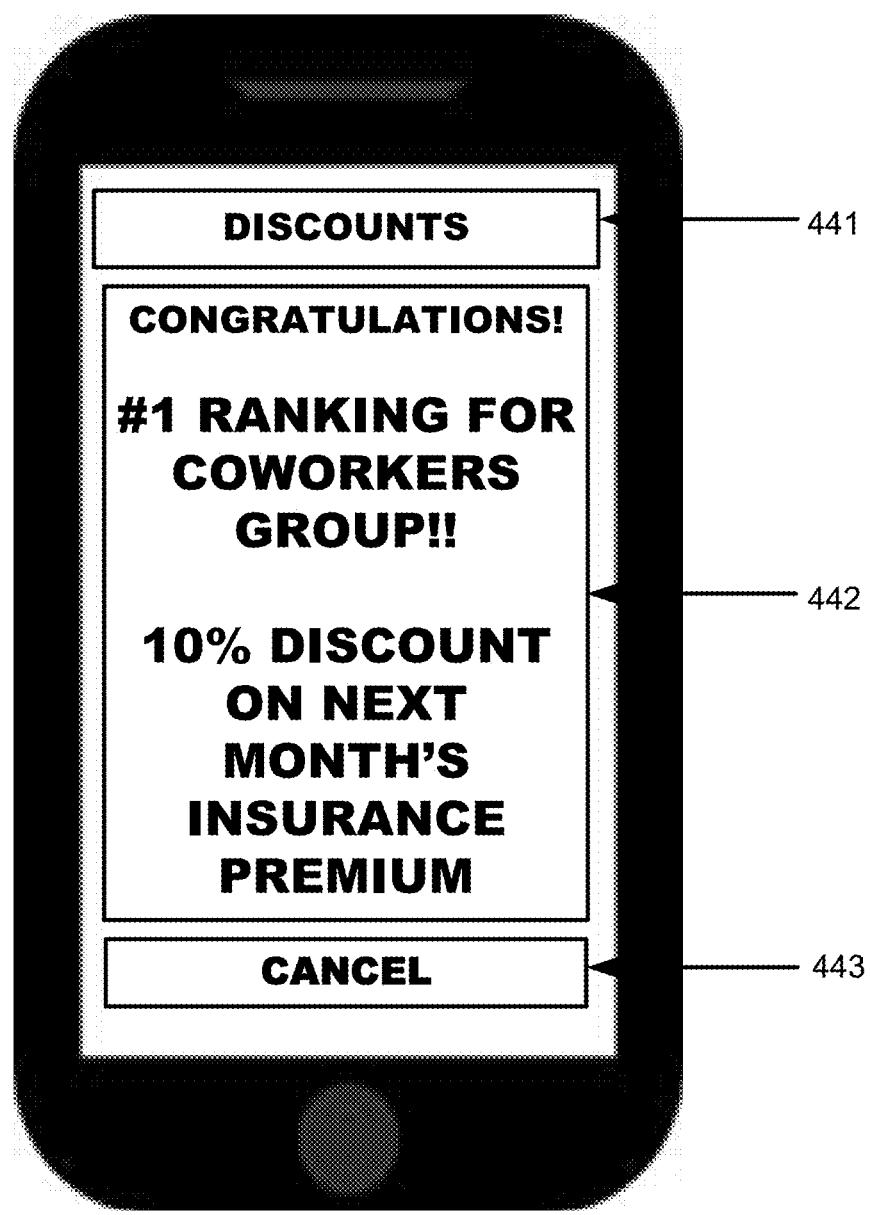

FIG. 4E depicts a display interface 440 that may be accessed upon the user selecting the interactive portion 433 ("VIEW DISCOUNTS") on display interface 430. The display interface 440 may include an information box 441 that identifies which page of the DCG application the user is viewing. Additionally, the display interface 440 may include another information box 442 that congratulates the user for a high ranking in a particular comparison group. Although not depicted on the user interface 440 shown in FIG. 4E, the information box 442 may congratulate the user for a high ranking in more than one particular comparison group. The information box 442 may also display a discount for the user's next month's automobile insurance premium. The display interface 440 may also include an interactive portion 443, which indicates "CANCEL," thereby enabling a user to exit the application, to return to a prior screen, to exit to the home screen, etc.

Figure 4F:
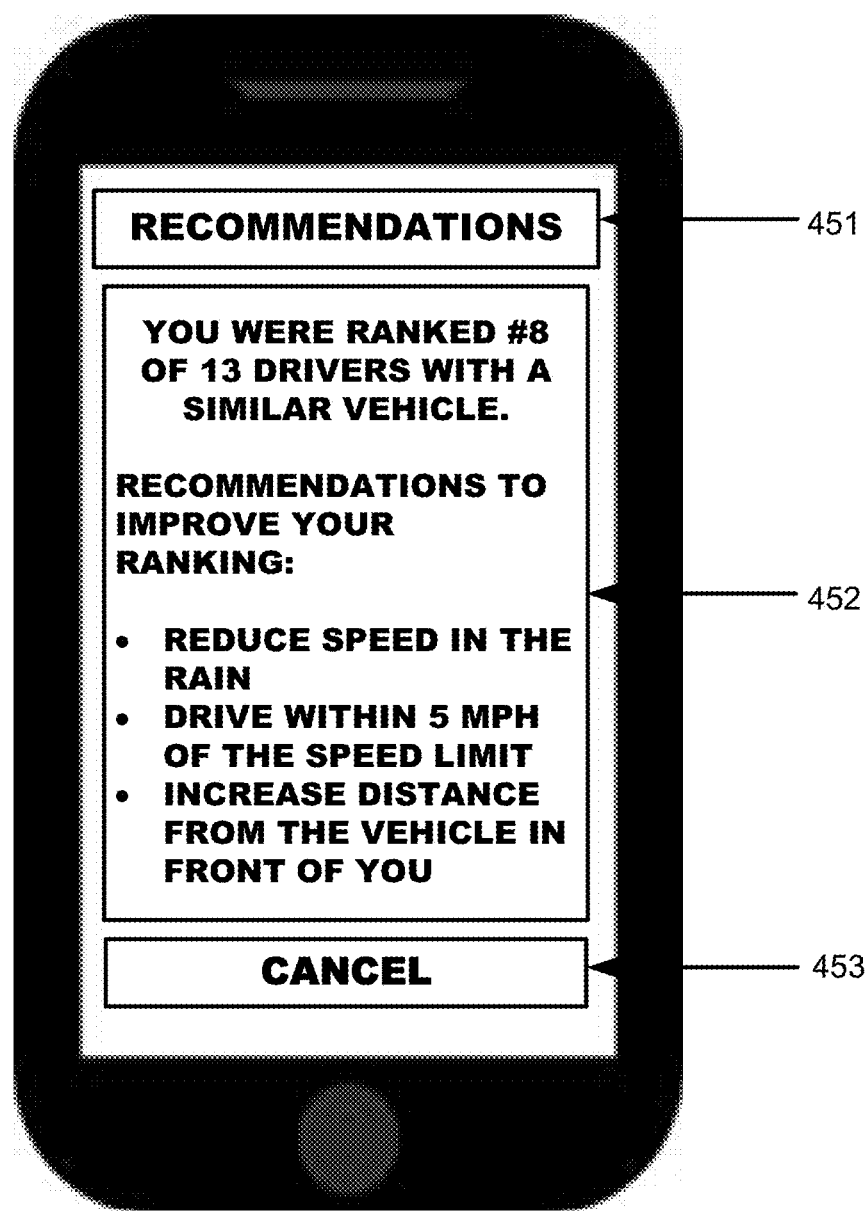

FIG. 4F depicts a display interface 450 that may be accessed if the user selects the interactive portion 434 ("VIEW RECOMMENDATIONS") from display interface 430. The display interface 450 may include an information box 451 that identifies which page of the DCG application the user is viewing. Additionally, the display interface 450 may include another information box 452 that displays a list of recommendations to the user to improve his/her driving behavior based upon a low ranking in a particular comparison group, or a ranking that otherwise does not qualify for any discount or other monetary incentive. Although not depicted in the user interface 450 shown in FIG. 4F, the information box 452 may indicate more than one particular comparison group in which the user received a low ranking.

The display interface 440 may also include an interactive portion 453, which indicates "CANCEL," thereby enabling a user to exit the application, to return to a prior screen, to exit to the home screen, etc.

Figure 4G:
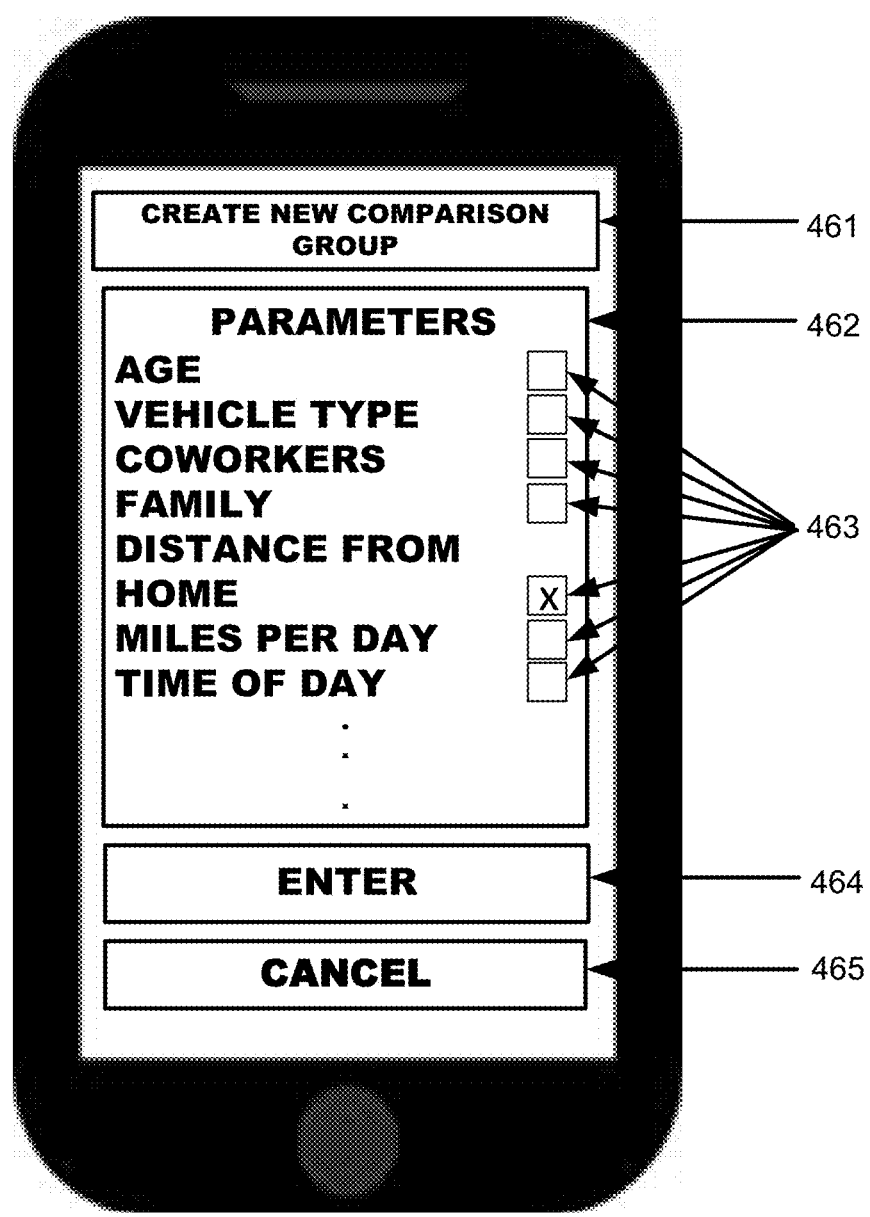

FIG. 4G depicts a display interface 460 that may be accessed upon the user selecting the interactive portion 404 ("CREATE NEW COMPARISON GROUP") from display interface 400. The display interface 460 may include an information box 461 that identifies which page of the DCG application the user is viewing. Additionally, the display interface 460 may include another information box 462 that displays a list of parameters that may be selected by the user to create a new comparison group. Within the information box 462, there may be interactive portions 463 next to each parameter that are boxes that the user may "check" or "uncheck" based upon the one or more parameters by which the user selects to define a new comparison group. The interactive portions 463 that are selected with a "check" thus indicate the selected one or more parameters for a new comparison group. The display interface 460 may also include an interactive portion 464 ("ENTER")," thereby enabling the user to submit his/her selections of variables that the new comparison group will be defined by and create the new comparison group. In such a case, the electronic device may transmit the selections to a remote server (e.g., server 200), which then matches other drivers having the selected parameters to create the new group. Additionally, the display interface 460 may include an interactive portion 465, which indicates "CANCEL," thereby enabling a user to exit the application, to return to a prior screen, to exit to the home screen, etc.

Figure 4H:
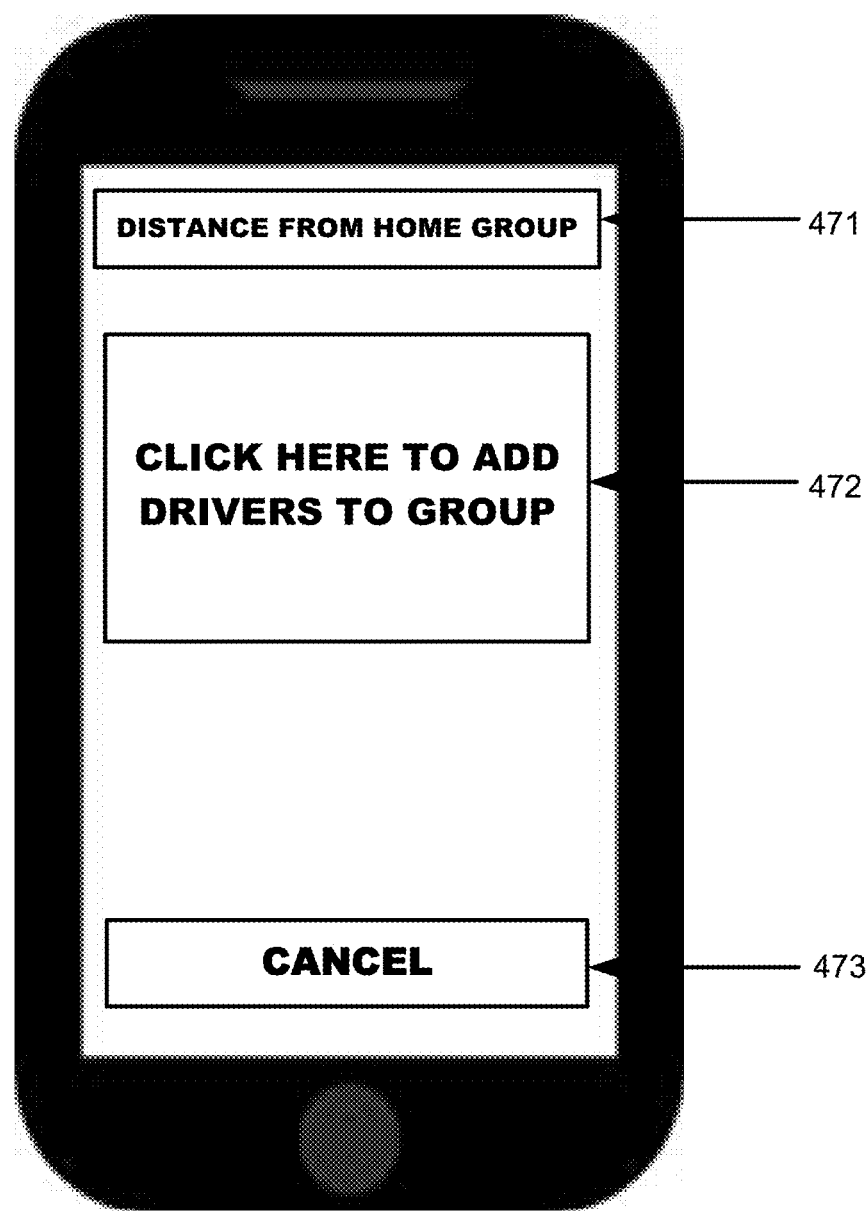

FIG. 4H depicts a display interface 470 that may be accessed if the user selects the interactive portion 464 ("ENTER") from display interface 460. The display interface 470 may include an information box 471 that identifies which page of the DCG application the user is viewing. The display interface 470 may also include an interactive portion 472, which indicates to "CLICK HERE TO ADD DRIVERS TO GROUP," thereby enabling the user to add drivers that match all of the variables selected by the user to the new comparison group. These aspects may be particular useful, for example, to facilitate user selections of the drivers within the comparison group instead of the remote server performing these functions.

For example, if the user selected (i.e., "checked") the parameter "DISTANCE FROM HOME" on display interface 460, and subsequently submitted his/her selection by selecting interactive portion 464 ("ENTER") on display interface 460, the user may be able to add drivers that are within a threshold number of miles from his/her home by selecting the interactive portion 472 on display interface 470. Although not depicted on the display interface 470 shown in FIG. 4H for purposes of brevity, the display interface 470 may also display an interactive portion (or an information box with an embedded interactive portion) that may allow the user to enter the threshold amount of miles from his/her home to further define the comparison group, and thus, identify only drivers within the threshold amount of miles for inclusion into the comparison group. Additionally, the display interface 470 may include an interactive portion 473, which indicates "CANCEL," thereby enabling a user to exit the application, to return to a prior screen, to exit to the home screen, etc.

Figure 5:
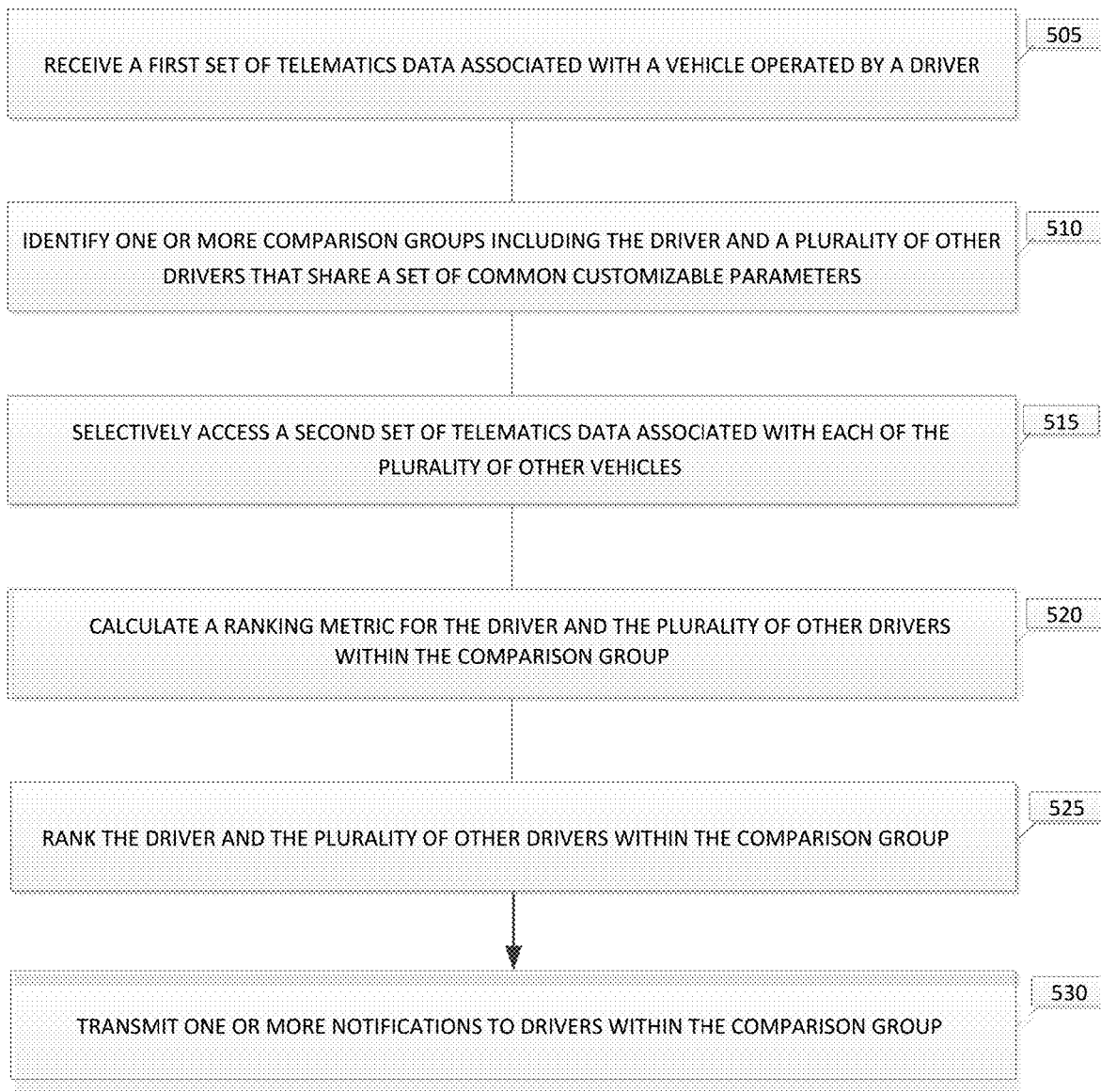
FIG. 5 depicts an exemplary flow diagram, in accordance with certain aspects of the present technology.

Exemplary Computer-Implemented Method for Using Dynamic Comparison Groups for Ranking Drivers and Updating Insurance Information FIG. 5 depicts an exemplary flow diagram, in accordance with certain aspects of the present technology. FIG. 5 illustrates an exemplary computer-implemented method 500 for using dynamic comparison groups to rank drivers and update insurance information. In various aspects, one or more portions of the method 500 (or the entire method 500) may be facilitated by one or more processors of a suitable computing device (such as the remote server 150 as discussed with respect to FIG. 1, the remote server 200 as discussed with respect to FIG. 2, the electronic devices 125, 135, and 145 as discussed with respect to FIG. 1, the electronic device 300 as discussed with respect to FIG. 3, etc.). In one aspect, a remote server may receive telematics data and execute one or more applications to facilitate the functionalities of the method 500. For example, method 500 may be realized via execution of the DCG application 262 via controller 220 and/or processor unit 240, as discussed above with reference to FIG. 2.

In various aspects, the DCG application 262 may support a "gamified" overall system and interface, such as the various interfaces shown and discussed above with reference to FIGS. 4A-4H, for example. The gamification of the DCG application 262 may advantageously allow for more enjoyment from the users (i.e., drivers), and therefore more users may decide to participate by opting-in, downloading, and participating in the system to be ranked within one or more comparison groups. The gamification of the DCG application 262 may also promote competition between the drivers of a comparison group because of the ranking of drivers (such as the display interfaces 420 and 430 as discussed with respect to FIGS. 4C-4D) within each comparison group. Additionally, the incentive to receive discounts on a driver's automobile insurance premium for a high ranking within a comparison group may motivate the driver to exhibit safer driving behavior and to achieve a higher ranking within a comparison group.

The gamification of the DCG application 262 may also function as a social network, allowing drivers that belong to the same comparison group to interact with one another. For example, as shown in the display interface 420, drivers may be able to send messages to other drivers within the same comparison group. This feature may enhance the enjoyment and competition for each driver that belongs to that comparison group. Additionally, the ability for a driver to create his/her own customized comparison groups based upon customizable selected parameters (such as those shown in the display interface 460 as discussed with respect to FIG. 4G) allows drivers that share the same parameters (i.e., belong to the same comparison group) to communicate with and compete with one another. This may open up additional options regarding meeting other drivers that are the same age, live in the same neighborhood, etc., that he/she may have otherwise never met.

The method 500 may begin when the one or more processors receive a first set of telematics data associated with a vehicle (such as the target vehicle, as previously discussed) (block 505). Again, this first set of telematics data may include information related to vehicle speed, acceleration, cornering, braking, direction, route, heading, GPS information (e.g., speed and location), etc., as well as weather conditions, road conditions, traffic conditions, etc., at the time the first set of telematics data was received.

Using Customizable Parameters to Create Comparison Groups

Method 500 may include one or more processors identifying one or more comparison groups including the driver and a plurality of other drivers that share a set of common customizable parameters (block 510). In particular, each of the other drivers may be associated with operating a respective vehicle. In various aspects, the customizable parameters may include any suitable customizable parameters identified by the target user, the insurer, one of the other drivers, etc. For example, the customizable parameters may include parameters or other information based upon demographics, location, time, behavior, driving routes, a type of vehicle, weather, a type of social networking group to which each driver participates (including the system described herein), etc. Therefore, a comparison group may be created by identifying other drivers having parameters that match the selected parameters. In this way, a user of the DCG application 262 (e.g., the driver of the target vehicle) may create very specific and granular comparison group(s) based upon the user's preferences. Examples for each type of parameter are provided below:

Demographics: Drivers that share the same demographic parameter(s) may be, for example, in the same age group, same income bracket, same job title, have the same immediate or extended family, etc.

Location: Drivers that share the same location parameter(s) may be defined, for example, by drivers in the same office building, the same neighborhood, the same zip code, the same city, etc. Furthermore, drivers that share the same location parameter(s) may be defined, for example, by drivers within a defined threshold radius or within a defined geofence from a specific location.

Time: Drivers that share the same time parameter(s) may be defined, for example, by drivers that travel on the same roadways or frequent the same locations at the same time of day, day of the week, etc.

Behavior: Drivers that share the same behavior parameter(s) may be defined, for example, by various types of lifestyle and/or psychographic information, such as drivers who frequent the same locations (e.g., restaurants, gas stations, retail stores, etc.), consistently drive within a certain threshold miles per hour (mph) of the speed limit, drivers in similar credit score tiers, drivers who have similar driving records, drivers having similar commute patterns, etc.

Driving routes: Drivers that share the same driving routes parameter(s) may be defined, for example, by an indication of drivers that travel the same roadways frequently, travel mostly on highways, avoid travelling on highways, etc.

Type of vehicle: Drivers that share the same type of vehicle parameter(s) may be defined, for example, by drivers with the same make and model of vehicle (e.g., Toyota Camry, Ford Escape, etc.), the same make of vehicle (e.g., Subaru, Honda, etc.), the same class of vehicle (e.g., compact, midsize, SUV, pickup truck, etc.), the same color of vehicle, etc.

Weather: Drivers that share the same weather parameter(s) may be defined, for example, by drivers that travel on the same roadways during the same weather conditions (e.g., clear and sunny, rain, snow, fog, etc.).

Social Networking Group: Drivers that share the same type of social networking group parameter(s) may be defined, for example, by drivers who belong to the same social networking group such as drivers who are active participants of the same type of social networks (e.g., Facebook, Twitter, Instagram, Snapchat, etc.), have the same circle of friends, are involved in similar activities, are in the same sports league, etc.).

To determine if a particular driver belongs in a certain comparison group, one or more of the customizable parameters may be associated with each driver and accessed by a computing device (e.g., server 200) to match drivers to selected parameters. Information such as personal information, automobile insurance policy information, telematics data for a vehicle associated with the driver, third party data, etc., may be accessed to determine whether each driver should be matched to various defined parameters and, if so, then included in a comparison group with other drivers having the same parameters in common.

For example, personal information for the driver may be used to determine the age of the driver, the home and/or work address of the driver, the gender of the driver, etc. As another example, the automobile insurance policy information for the driver may be used to determine the make, model, year of manufacture, color, etc., for the vehicle associated with the driver, as well as information about the driver's current and previous automobile insurance premiums, current and previous rankings for the comparison groups to which the driver belongs, etc. To provide yet another example, the telematics data (e.g., GPS data, heading, route, etc.) for a vehicle associated with the driver may be used to determine the speeds at which the driver operates the vehicle, roadways used frequently by the driver, businesses that the driver frequently visits, time of day and day of week that the driver travels in his/her vehicle, etc. To provide an additional example, third-party data may be accessed and used to determine social networking and other behavior.

Notifying Other Drivers Once a Comparison Group is Created

Again, a driver may create a customized comparison group by selecting the desired customizable parameters via a suitable computing device (e.g., the electronic device 300), as shown and discussed above with reference to FIGS. 4A and 4G. For example, the driver may select the interactive portion 404 from display interface 400, which may direct the driver to the display interface 460 and allow the user to select parameters for the comparison group the driver wants to create. In various aspects, after the driver creates the customized comparison group, the one or more processors of the electronic device may result in a notification being transmitted directly or indirectly (e.g., via the remote server 300) to the other drivers in the comparison group requesting that they join. For example, the driver may select the interactive portion 472 from the display interface 470, as shown in FIG. 4H, to cause a notification to be transmitted to other electronic devices associated with each of the other drivers in the comparison group. The notification to join the group may be transmitted in any suitable format, such as in the form of a text message, an email, a phone call, a push notification, a message within the DCG application 262 when executed on a mobile computing device, etc.

In various aspects, after the notification requesting other drivers to join the comparison group is sent, the one or more processors may identify a subset of participating drivers from those in the initial comparison group (i.e., all drivers matching the selected parameters discussed herein) that includes only the drivers who have agreed to join. For example, the subset of participating drivers may include those drivers who accepted an invitation via text message, email, push notification, etc. to join the comparison group, which may be sent from an electronic device associated with the driver who created the comparison group. In some embodiments, the driver who creates a comparison group may receive a notification (i.e., via his or her respective electronic device) whenever another driver accepts the invitation to join the comparison group, thereby allowing the driver who created the comparison group to know which drivers, how many drivers, etc. accepted the invitation to join the comparison group.

Additionally, in some embodiments, the driver who created the comparison group may act as an administrator of the created comparison group, and may therefore have the ability to refuse particular drivers from joining, remove particular drivers, etc. Further, in certain embodiments, each of the drivers that are allowed to join the comparison group may be able to view the other drivers within the comparison group via a display interface associated with each respective electronic device (such as the information box 422 of the display interface 420, as discussed above with respect to FIG. 4C).

In some embodiments, a comparison group may be static, meaning no new drivers may join the group after it is created. But in other embodiments, a comparison group may be dynamic, meaning new drivers who have the same parameters in common with the other drivers in the comparison group may be periodically added to that comparison group at any time after the comparison group was originally created. These new drivers may be identified, for example, via the one or more processors of the server 200 periodically or continuously searching for drivers having the parameters matching those that define the comparison group. Once these new drivers are identifies, embodiments include the server 200 transmitting notifications to an electronic device associated with each of these newly identified drivers requesting that they join the comparison group. In other embodiments, the one or more processors of the server 200 may transmit a notification to an electronic device associated with a target, or administrator, of the comparison group, and allow the administrator to decide whether additional drivers should be asked to join.

In still other embodiments, the one or more processors of the server 200 may automatically update the drivers within one or more comparison groups with little or no user intervention. For example, the server 200 may periodically (e.g., daily, weekly, monthly, etc.) identify new drivers having parameters matching those that define one or more comparison groups, and automatically add these new drivers as new data is obtained.

Selectively Accessing Telematics Data

After the comparison group is formed, the method 500 may include the one or more processors selectively accessing a second set of telematics data associated with each of the other vehicles (block 515). In various aspects, this may include only accessing telematics data associated with each driver who has agreed to be added to the comparison group (i.e., the subset of participating drivers, as discussed herein). In other aspects, selectively accessing the second set of telematics data may include, for example, only accessing telematics data for drivers who have opted-in to sharing their data or having their telematics data collected and transmitted to another party, such as an insurer. In still other aspects, selectively accessing the second set of telematics data may include, for example, only accessing telematics data for drivers who have a threshold amount of telematics data collected, such that an accurate ranking may be performed.

In various aspects, the first set of telematics data and the second set of telematics data set of telematics data may include similar information that may be used to assess the relative driving safety and performance of each driver within a created comparisons group. For example, like the first set of telematics data, the second set of telematics data may also include sensor data associated with vehicle acceleration, velocity, cornering, braking, direction, route, heading, GPS information (e.g., speed and location), other location data, other information for each vehicle, etc., as well as weather conditions, road conditions, traffic conditions, etc. at the time the second set of telematics data was received. Moreover, the second set of telematics data may also be associated with each driver's vehicle within the comparison group.

Comparing Sets of Telematics Data and Calculating Ranking Metrics

Method 500 may include the one or more processors calculating a ranking metric for the driver and the other drivers within the comparison group (block 520). In various embodiments, the ranking metrics may be the result of calculating a driving score for each driver within a particular comparison group in any suitable manner, or the result of comparing data included within the various sets of telematics data in a single comparison group to one another.

To provide an illustrative example, the sets of telematics data associated with each driver within a comparison group may be analyzed over any suitable sampling period to calculate, for each driver, a driving score. For instance, this driving score may be based upon telematics data for each driver that is collected over the past day, week, month, etc. In various aspects, the driving score may correspond to any suitable combination, weighting, aggregation, etc., of various metrics indicated by the telematics data at any given point in time or averaged over several driving sessions.

Continuing this example, a ranking metric may be represented as a driving score having a quantified scaled value, grading system, etc., that indicates driving safety and performance for each particular driver within a comparison group. For example, the driving score may be represented as a number between 0 and 100, with 0 representing the least safe type of driver, and 100 representing the safest type of driver. To facilitate such calculations, aspects include the driving score calculation being implemented by starting with the highest safety rating (i.e., 100 in this example), and being reduced over time upon the occurrence of various driving events, as indicated by the various sensor metrics includes in the first and second sets of telematics data.

Continuing this example, acceleration, braking, and cornering data values included in the telematics data (e.g., measured via accelerometers) may indicate when each driver accelerated too fast, hit the brakes too hard, turned too quickly, etc. Furthermore, velocity data included in the telematics data may indicate whether, when correlated to the geographic location data, each driver typically obeys posted speed limits. Moreover, aspects include establishing a weighted system that deducts more points from the initial driving score based upon the severity of each event. For example, driving events related to acceleration, cornering, and braking may be categorized based upon their severity using a graduating thresholding system, where increasing threshold values, when exceeded, indicate increasing event severity. To provide another example, driving events related to speeding may be further categorized by severity based upon how much faster than the posted speed limit the operator was driving the vehicle.

These deductions may be calculated over any suitable time frame such that a driver's driving score accurately reflects her overall driving safety. For example, a new driving score may be calculated for each driving session, with the driving score representing a cumulative or rolling average of previous driving scores.

In other aspects, the ranking metrics may be based upon a comparison of certain data included in the sets of telematics data for each driver within a comparison group. In accordance with such aspects, one or more specific metrics may be selected and compared based upon their relative importance and relevance in ascertaining safe driving. To provide an illustrative example, the ranking metric may be based upon each average vehicle's velocity on one or more roads or how often each vehicle drives in excess of the posted speed limit. To this end, the vehicle speed from the first set of telematics data may be compared with the vehicle speed for each of the vehicles from the second set of telematics data.

Continuing this example, one vehicle (e.g., a "target" vehicle A) may drive, on average, 5 mph in excess of posted speed limits, whereas another vehicle within the comparison group (Vehicle "B" in this example) may drive, on average, 7 mph in excess of posted speed limits, and a third vehicle (Vehicle "C") may drive, on average 10 mph in excess of posted speed limits. Therefore, when the vehicle speed data for the Vehicles A, B, and C are compared to one another, a ranking metric could be calculated that indicates that a driver associated with Vehicle A should be ranked higher than the driver associated with Vehicle B, which should be ranked higher than the driver associated with Vehicle C.

To provide another illustrative example, one or more metrics included in the first and second sets of telematics data may be compared to an optimum value, or range of values, for each particular type of telematics data or sensor metric being compared. Using such a system, each driver may be ranked according to how close he or she drove at particular times, on particular routes or particular roads, on average, etc., within these defined ranges. In various aspects, these ranges may also be dynamically updated as competition increases (e.g., "tightened up") among drivers within the same comparison group, thereby further incentivizing good driving behavior to remain a top-ranking driver.

Ranking Drivers within a Comparison Group

Again, based upon the comparison between the first set of telematics data with the second set of telematics data, a ranking metric may be calculated for each driver within a comparison group. The method 500 may include the one or more processors ranking each driver within the comparison group using this calculated ranking metric (block 525). In this way, the rankings indicate which drivers exhibit safe driving behavior and which drivers exhibit less safe driving behavior within specifically-defined groups. In other words, drivers that are ranked higher exhibit safer driving behavior than those that are ranked lower. In such a case, the driver that is ranked #1 in a comparison group is the safest driver in that comparison group, and the driver that is ranked last in the comparison group is the least safe driver in that comparison group.

In various aspects, drivers within the same comparison group may be ranked in accordance with any suitable system that utilizes the aforementioned ranking metrics. For instance, the rankings may be based upon an average ranking of different types of telematics data for each driver. Continuing this example, a ranking metric may be calculated for each type of telematics data or sensor metric (e.g., acceleration, cornering, velocity, braking, etc.), and then these rankings metrics may be averaged by the total number of types of telematics data that were ranked. This averaging system may include weighted averages or via straight-averaging techniques. For example, if the types of telematics data that are ranked are vehicle speed, acceleration, cornering, and braking, the total ranking for a driver would be the sum of the each of the rankings divided by four (since there are four different types of telematics data that are ranked). Therefore, if the driver was ranked #3 for vehicle speed, #6 for acceleration, #4 for cornering, and #8 for braking, the sum of the rankings would be 21 and the average ranking for the driver would be 5.25 (21/4).

In certain embodiments, conditions such as weather conditions, road conditions, traffic conditions, etc. may contribute in determining driver rankings within a comparison group, assuming that weather conditions was not a parameter selected to define that particular comparison group. For example, if two different drivers (Driver X and Driver Y in this example) belonging to the same comparison group both took a right turn at 5 mph, but it was raining while Driver X was operating his/her vehicle, Driver Y may be ranked higher because Driver X should have been driving slower while making a right turn in wet road conditions. As another example, if the same two Drivers X and Y were traveling 5 mph over the respective posted speed limits on respective roadways, but Driver Y was operating his/her vehicle at a time when there was road construction, Driver X may be ranked higher because Driver Y should have been driving closer to the posted speed limit due to the road construction.

Transmitting Notifications to Drivers within a Comparison Group

In various aspects, after the rankings for each driver in a comparison group are determined, the one or more processors may optionally transmit one or more notifications to each driver's respective electronic device (block 530). For example, these notifications may include information indicative of the rankings of each driver in a comparison group. Continuing this example, the one or more processors may transmit the ranking for each driver within the comparison group to an electronic device for presentation within a gamified interface (e.g., the DCG application) discussed above with reference to FIGS. 4A-4H.

To provide another example, the one or more processors may transmit a notification to a top threshold percentage of ranked drivers within the comparison group offering a discount on automobile insurance premiums based upon each driver's individual rank in that comparison group (block 530). For example, the top threshold percentage for a comparison group may be the top 5%, the top 10%, the top 25%, etc., of the ranked drivers in the comparison group. For example, for a comparison group with 20 participating drivers, the four highest ranking drivers may be offered a discount on automobile insurance premiums to facilitate encouraging risk-averse driving.

In various aspects, an insurer may establish which comparison groups qualify for discounts or rules that determine how driver may qualify for such discounts. For example, an insurer may determine that a particular region or age bracket could particularly benefit from safer driving, and provide discounts to top-ranked drivers in comparison groups associated with those regions or age groups. To provide another example, discounts on automobile insurance premiums may be determined based upon an individual driver's combined or average ranking out of all of the comparison groups of which he/she may belong. For example, the information box 432 of display interface 430 shows that the driver rankings were #4, #8, #1, and #3, respectively, for each of the four comparison groups. Therefore, the combined or average ranking for the driver for all four comparison groups is #4 (16/4). Certain aspects include the insurance provider using this average ranking as opposed to (or in addition to) the ranking of any one comparison groups to determine whether the driver is eligible for a discount on his/her automobile insurance premium.

Again, the gamified interface may include one or more recommendations to improve the driver's driving habits and to improve the driver's rank within the comparison group. In some embodiments, the one or more processors may transmit a notification to a bottom threshold percentage of ranked drivers within the comparison group offering such recommendations. For example, the bottom threshold percentage for a comparison group may be the bottom 5%, the bottom 10%, the bottom 25%, etc., of the ranked drivers. For a comparison group with 20 participating drivers, the four lowest ranking drivers may be offered one or more recommendations to improve each driver's driving habits, and therefore his or her ranking, within the comparison group.

Exemplary Computer-Implemented Method for Using Dynamic Comparison Groups for Assessing Driving Safety In one aspect, a computer-implemented method for dynamic comparison groups for assessing driving safety may be provided. The method may include one or more processors (1) receiving a first set of telematics data associated with a vehicle operated by a driver; (2) identifying one or more comparison groups including the driver and a plurality of other drivers that share a set of common customizable parameters, each driver from among the plurality of other drivers operating a respective vehicle from among a plurality of other vehicles; (3) selectively accessing a second set of telematics data associated with each of the plurality of other vehicles; (4) calculating a ranking metric for the driver and each of the plurality of other drivers based upon the first set of telematics data and the second set of telematics data to generate a set of ranking metrics, and/or (5) ranking the driver and the plurality of other drivers within the comparison group based upon the set of ranking metrics. The method may include additional, less, or alternate actions, including those discussed elsewhere herein.

For instance, in various aspects, the set of customizable parameters include at least one of: (i) demographics, (ii) location, (iii) time, (iv) behavior, (v) driving routes, (vi) a type of vehicle, (vii) weather, and (viii) a type of social networking group.

The method may further include transmitting the ranking for the driver within the comparison group to an electronic device for presentation to the driver within a gamified interface. The gamified interface further includes one or more recommendations to improve the driver's driving habits and to improve the driver's rank within the comparison group.

Additionally or alternatively, the method may include (1) transmitting a notification to the plurality of other drivers in the comparison group requesting that they join the comparison group; and (2) identifying a subset of participating drivers from among the plurality of drivers who agree to join the comparison group; and/or (3) the act of selectively accessing the second set of telematics data associated with each of the plurality of other vehicles includes only accessing telematics data for each of the vehicles associated with each driver among the subset of participating drivers.

Furthermore, the method may include (1) transmitting, to a respective electronic device associated with each of the participating drivers, each participating driver's individual ranking within the comparison group; and/or (2) transmitting a notification to a top threshold percentage of ranked drivers within the comparison group offering a discount on insurance premiums based upon each driver's individual rank.

Exemplary Remote Server for Using Dynamic Comparison Groups for Assessing Driving Safety In another aspect, a server for dynamic comparison groups for assessing driving safety may be provided. The server may include (1) a communication unit configured to receive a first set of telematics data associated with a vehicle operated by a driver; and (2) a processor unit configured to: (a) identify one or more comparison groups including the driver and a plurality of other drivers that share a set of common customizable parameters, each driver from among the plurality of other drivers operating a respective vehicle from among a plurality of other vehicles; (b) selectively access a second set of telematics data associated with each of the plurality of other vehicles; (c) calculate a ranking metric for the driver and each of the plurality of other drivers based upon the first set of telematics data and the second set of telematics data to generate a set of ranking metrics; and/or (d) ranking the driver and the plurality of other drivers within the comparison group based upon the set of ranking metrics. The server may include additional, less, or alternate functionality, including that discussed elsewhere herein.

For instance, in various aspects, the set of customizable parameters include at least one of: (i) demographics, (ii) location, (iii) time, (iii) behavior, (iv) driving routes, (vi) a type of vehicle, (vii) weather, and (viii) a type of social networking group.

The communication unit may further be configured to transmit the ranking for the driver within the comparison group to an electronic device for presentation to the driver within a gamified interface. The gamified interface further includes one or more recommendations to improve the driver's driving habits and to improve the driver's rank within the comparison group.

Additionally or alternatively, (1) the communication unit may further be configured to transmit a notification to the plurality of other drivers in the comparison group requesting that they join the comparison group, and/or (2) the processor unit may be further configured to identify a subset of participating drivers from among the plurality of drivers who agree to join the comparison group, and to selectively access the second set of telematics data associated with each of the plurality of other vehicles includes by only accessing telematics data for each of the vehicles associated with each driver among the subset of participating drivers.

Furthermore, the communication unit may further be configured to (1) transmit, to a respective electronic device associated with each of the participating drivers, each participating driver's individual ranking within the comparison group; and/or (2) transmit a notification to a top threshold percentage of ranked drivers within the comparison group offering a discount on insurance premiums based upon each driver's individual rank.

Exemplary Non-Transitory Computer-Readable Medium for Using Dynamic Comparison Groups for Assessing Driving Safety In yet another aspect, a tangible, non-transitory computer-readable medium or media for dynamic comparison groups for assessing driving safety may be provided. The tangible, non-transitory computer-readable medium may include instructions executable by one or more processors that, when executed by the one or more processors, cause the one or more processors to (1) receive a first set of telematics data associated with a vehicle operated by a driver; (2) identify one or more comparison groups including the driver and a plurality of other drivers that share a set of common customizable parameters, each driver from among the plurality of other drivers operating a respective vehicle from among a plurality of other vehicles; (3) selectively access a second set of telematics data associated with each of the plurality of other vehicles; (4) calculate a ranking metric for the driver and each of the plurality of other drivers based upon the first set of telematics data and the second set of telematics data to generate a set of ranking metrics; and (5) rank the driver and the plurality of other drivers within the comparison group based upon the set of ranking metrics. The instructions may include or direct additional, less, or alternate functionality, including that discussed elsewhere herein.

For instance, in various aspects, the set of customizable parameters include at least one of: (i) demographics, (ii) location, (iii) time, (iii) behavior, (iv) driving routes, (vi) a type of vehicle, (vii) weather, and (viii) a type of social networking group.

The instructions, when executed by one or more processors, may further cause the one or more processors to transmit the ranking for the driver within the comparison group to an electronic device for presentation to the driver within a gamified interface that includes one or more recommendations to improve the driver's driving habits and to improve the driver's rank within the comparison group.

Additionally or alternatively, the instructions, when executed by one or more processors, may further cause the one or more processors to (1) transmit a notification to the plurality of other drivers in the comparison group requesting that they join the comparison group; (2) identify a subset of participating drivers from among the plurality of drivers who agree to join the comparison group; and/or (3) selectively access the second set of telematics data associated with each of the plurality of other vehicles by only accessing telematics data for each of the vehicles associated with each driver among the subset of participating drivers.

Furthermore, the instructions, when executed by one or more processors, may further cause the one or more processors to (1) transmit, to a respective electronic device associated with each of the participating drivers, each participating driver's individual ranking within the comparison group; and/or (2) transmit a notification to a top threshold percentage of ranked drivers within the comparison group offering a discount on insurance premiums based upon each driver's individual rank.

ADDITIONAL CONSIDERATIONS

As used herein, the term "vehicle" is used interchangeably with "automobile" and the term "automobile" refers to any type of powered transportation device, which includes, but is not limited to, a car, truck, bus, motorcycle, or boat—including fully or partially self-driving (i.e., autonomous or semi-autonomous) vehicles. While a vehicle may be described herein as being controlled by an operator or insured individual, the aspects described herein also apply to autonomous vehicles that may be unmanned and/or operated remotely or in another suitable fashion, such as via controls other than the steering wheel, gear shift, brake pedal, and accelerator pedal.

The systems and methods described herein are directed to an improvement to computer functionality, and improve the functioning of conventional computers.

With the foregoing, an insurance customer may opt-in to a rewards, insurance discount, or other type of program. After the insurance customer provides their affirmative consent, an insurance provider remote server may collect data from the customer's mobile device, on-board vehicle computer, or other devices—such as with the customer's permission or affirmative consent. The data collected may be related to vehicle functionality (or vehicle occupant preferences or preference profiles) or vehicle operation, and/or insured assets before (and/or after) an insurance-related event, including those events discussed elsewhere herein. In return, risk-averse insureds, vehicle owners, or vehicle occupants may receive discounts or insurance cost savings related to auto insurance, as well as home, renters, personal articles, and other types of insurance from the insurance provider.

In one aspect, smart or interconnected vehicle data, and/or other data, including the types of data discussed elsewhere herein, may be collected or received by an insurance provider remote server, such as via direct or indirect wireless communication or data transmission from an on-board vehicle computer, mobile device, or other customer computing device, after a customer affirmatively consents or otherwise opts-in to an insurance discount, reward, or other program. The insurance provider may then analyze the data received with the customer's permission to provide benefits to the customer. As a result, risk-averse customers may receive insurance discounts or other insurance cost savings based upon data that reflects low risk behavior and/or technology that mitigates or prevents risk to (i) insured assets, such as homes, personal belongings, or vehicles, and/or (ii) vehicle, home, or apartment occupants.

This detailed description is to be construed as exemplary only and does not describe every possible embodiment, as describing every possible embodiment would be impractical, if not impossible. One may be implement numerous alternate embodiments, using either current technology or technology developed after the filing date of this application.

Furthermore, although the present disclosure sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims. Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some exemplary embodiments, the one or more processors or processor-implemented modules may be located in a single geographic location (e.g., within a vehicle, within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed is:

1. A computer-implemented method for assessing drivers, comprising:
   receiving, by one or more processors, a first set of telematics data associated with a vehicle operated by a driver;
   receiving, by the one or more processors, a selection of one or more common customizable parameters;
   determining, by the one or more processors, a plurality of other drivers that share the one or more common customizable parameters with the driver to identify one or more comparison groups;
   identifying, by the one or more processors, a subset of participating drivers from among the plurality of other drivers who have agreed to join the identified one or more comparison groups;
   selectively accessing, by the one or more processors, a second set of telematics data associated with each of a plurality of other vehicles operated by each of the subset of participating drivers from among the plurality of other drivers who have agreed to join the identified one or more comparison groups;
   calculating, by the one or more processors, ranking metrics for the driver and each of the subset of participating drivers from among the plurality of other drivers based upon a comparison of the first set of telematics data and the second set of telematics data;
   ranking, by the one or more processors, the driver and each of the subset of participating drivers from among the plurality of other drivers in the identified one or more comparison groups based upon the ranking metrics; and
   causing, by the one or more processors, the ranking in the identified one or more comparison groups to be displayed in a user interface of an electronic device of the driver.

2. The computer-implemented method of claim 1, wherein the one or more common customizable parameters include at least one of: (i) demographics, (ii) location, (iii) time, (iv) behavior, (v) driving routes, (vi) a type of vehicle, (vii) weather, or (viii) a type of social networking group.

3. The computer-implemented method of claim 1, further comprising:
   transmitting, by the one or more processors, the ranking in the identified one or more comparison groups to the electronic device for presentation to the driver within a gamified interface.

4. The computer-implemented method of claim 3, wherein the gamified interface further includes one or more recommendations to improve the driver's driving habits and to improve the driver's rank within the identified one or more comparison groups.

5. The computer-implemented method of claim 1, further comprising transmitting a notification to the plurality of other drivers that share the one or more common customizable parameters with the driver requesting that the plurality of other drivers join the identified one or more comparison groups.

6. The computer-implemented method of claim 5, further comprising transmitting ranking information for each of the subset of participating drivers to a respective electronic device associated with each of the subset of participating drivers.

7. The computer-implemented method of claim 1, further comprising transmitting a notification to a top threshold percentage of drivers ranked within the identified one or more comparison groups to offer a discount on insurance premiums based upon the ranking.

8. A server configured to assess drivers, comprising:
   a communication unit; and
   a processor unit configured to:
      receive, via the communication unit, a first set of telematics data associated with a vehicle operated by a driver;
      receive, via the communication unit, a selection of one or more common customizable parameters;
      determine a plurality of other drivers that share the one or more common customizable parameters with the driver to identify one or more comparison groups;
      identify a subset of participating drivers from among the plurality of other drivers who have agreed to join the identified one or more comparison groups;
      selectively access, via the communication unit, a second set of telematics data associated with each of a plurality of other vehicles operated by each of the subset of participating drivers from among the plurality of other drivers who have agreed to join the identified one or more comparison groups;
      calculate ranking metrics for the driver and each of the subset of participating drivers from among the plurality of other drivers based upon a comparison of the first set of telematics data and the second set of telematics data;
      rank the driver and each of the subset of participating drivers from among the plurality of other drivers in the identified one or more comparison groups based upon the ranking metrics; and
      cause the ranking in the identified one or more comparison groups to be displayed in a user interface of an electronic device of the driver.

9. The server of claim 8, wherein the one or more common customizable parameters include at least one of: (i) demographics, (ii) location, (iii) time, (iv) behavior, (v) driving routes, (vi) a type of vehicle, (vii) weather, or (viii) a type of social networking group.

10. The server of claim 8, wherein the processor unit is further configured to transmit the ranking in the identified one or more comparison groups to the electronic device for presentation to the driver within a gamified interface.

11. The server of claim 10, wherein the gamified interface further includes one or more recommendations to improve the driver's driving habits and to improve the driver's rank within the identified one or more comparison groups.

12. The server of claim 8, wherein the processor unit is further configured to transmit a notification to the plurality of other drivers that share the one or more common customizable parameters with the driver requesting that the plurality of other drivers join the identified one or more comparison groups.

13. The server of claim 12, wherein the processor unit is further configured to transmit ranking information for each of the subset of participating drivers to a respective electronic device associated with each of the subset of participating drivers.

14. The server of claim 8, wherein the processor unit is further configured to transmit a notification to a top threshold percentage of drivers ranked within the identified one or more comparison groups to offer a discount on insurance premiums based upon the ranking.

15. A tangible, non-transitory, computer-readable medium storing instructions that, when executed by one or more processors, cause the one or more processors to:
    receive a first set of telematics data associated with a vehicle operated by a driver;
    receive a selection of one or more common customizable parameters;
    determine a plurality of other drivers that share the one or more common customizable parameters with the driver to identify one or more comparison groups;
    identify a subset of participating drivers from among the plurality of other drivers who have agreed to join the identified one or more comparison groups;
    selectively access a second set of telematics data associated with each of a plurality of other vehicles operated by each of the subset of participating drivers from among the plurality of other drivers who have agreed to join the identified one or more comparison groups;
    calculate ranking metrics for the driver and each of the subset of participating drivers from among the plurality of other drivers based upon a comparison of the first set of telematics data and the second set of telematics data;
    rank the driver and each of the subset of participating drivers from among the plurality of other drivers in the identified one or more comparison groups based upon the ranking metrics; and
    cause the ranking in the identified one or more comparison groups to be displayed in a user interface of an electronic device of the driver.

16. The tangible, non-transitory, computer-readable medium of claim 15, wherein the one or more common customizable parameters include at least one of: (i) demographics, (ii) location, (iii) time, (iv) behavior, (v) driving routes, (vi) a type of vehicle, (vii) weather, or (viii) a type of social networking group.

17. The tangible, non-transitory, computer-readable medium of claim 15, wherein the instructions, when executed by the one or more processors, further cause the one or more processors to transmit the ranking in the identified one or more comparison groups to the electronic device for presentation to the driver within a gamified interface, the gamified interface including one or more recommendations to improve the driver's driving habits and to improve the driver's rank within the one or more comparison groups.

18. The tangible, non-transitory, computer-readable medium of claim 15, wherein the instructions, when executed by one or more processors, further cause the one or more processors to transmit a notification to the plurality of other drivers that share the one or more common customizable parameters with the driver requesting that the plurality of other drivers join the identified one or more comparison groups.

19. The tangible, non-transitory, computer-readable medium of claim 18, wherein the instructions, when executed by one or more processors, further cause the one or more processors to transmit ranking information for each of the subset of participating drivers to a respective electronic device associated with each of the subset of participating drivers.

20. The tangible, non-transitory, computer-readable medium of claim 15, wherein the instructions, when executed by one or more processors, further cause the one or more processors to transmit a notification to a top threshold percentage of drivers ranked within the identified one or more comparison groups to offer a discount on insurance premiums based upon the ranking.

\* \* \* \* \*